(12) United States Patent
Yamazaki et al.

(10) Patent No.: US 8,297,518 B2
(45) Date of Patent: Oct. 30, 2012

(54) PAPER MONEY, COIN, VALUABLE INSTRUMENT, CERTIFICATES, TAG, LABEL, CARD, PACKING CONTAINERS, DOCUMENTS, RESPECTIVELY INSTALLED WITH INTEGRATED CIRCUIT

(75) Inventors: Shunpei Yamazaki, Setagaya (JP); Yasuyuki Arai, Atsugi (JP); Yohei Kanno, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 13/164,797

(22) Filed: Jun. 21, 2011

(65) Prior Publication Data
US 2011/0248089 A1  Oct. 13, 2011

Related U.S. Application Data

(62) Division of application No. 11/017,791, filed on Dec. 22, 2004, now Pat. No. 7,975,926.

(30) Foreign Application Priority Data

Dec. 26, 2003  (JP) .................................. 2003-433448

(51) Int. Cl.
G06K 19/00  (2006.01)
(52) U.S. Cl. ....................................................... 235/492
(58) Field of Classification Search .................. 235/492, 235/375, 379, 435, 439, 487
See application file for complete search history.

(56) References Cited

U.S. PATENT DOCUMENTS

| | | | |
|---|---|---|---|
| 5,126,541 A | 6/1992 | Shinagawa | |
| 5,286,962 A | 2/1994 | Fujioka et al. | |
| 6,317,721 B1 | 11/2001 | Hurta et al. | |
| 6,488,204 B1 | 12/2002 | Morooka et al. | |
| 6,694,436 B1 | 2/2004 | Audebert | |
| 6,772,955 B2 | 8/2004 | Yoshimoto et al. | |
| 6,811,089 B2 | 11/2004 | Sekiya | |
| 6,814,832 B2 | 11/2004 | Utsonomiya | |
| 6,819,986 B2 | 11/2004 | Hong et al. | |
| 7,230,316 B2 | 6/2007 | Yamazaki et al. | |

(Continued)

FOREIGN PATENT DOCUMENTS

JP  2003-110458  4/2003

(Continued)

OTHER PUBLICATIONS

Nikkei Electronics, *"Sense of Crisis" is a Trigger. Ignited Evolution of a Sesame-Grain Sized Chip, Technology Development is Entering Into the Second Phase*, pp. 67-76, Nov. 18, 2002.

*Primary Examiner* — Seung Lee
(74) *Attorney, Agent, or Firm* — Eric J. Robinson; Robinson Intellectual Property Law Office, P.C.

(57) ABSTRACT

Although a product having such the IC chip has been diffused, information on the product may be capable of being perceived, abstracted, falsified, or the like by a third person with his external device during distribution of the product or after purchase of the product. Further, privacy may be seriously infringed. Paper money, various products, and the like are disclosed according to the present invention with an integrated circuit device having a switching memory for controlling reading and writing of information (lock/unlock of information) in order to protect the information recorded and stored in the integrated circuit such as an IC chip installed to the product or the like.

15 Claims, 24 Drawing Sheets

U.S. PATENT DOCUMENTS

| | | |
|---|---|---|
| 7,240,846 B2 | 7/2007 | Arisawa et al. |
| 7,271,076 B2 | 9/2007 | Yamazaki et al. |
| 7,518,692 B2 | 4/2009 | Yamazaki et al. |
| 7,566,001 B2 * | 7/2009 | Yamazaki ..................... 235/492 |
| 7,647,505 B2 | 1/2010 | Yudasaka |

FOREIGN PATENT DOCUMENTS

| | | |
|---|---|---|
| JP | 2003-263623 | 9/2003 |
| JP | 2004-100166 | 4/2004 |

* cited by examiner

FIG. 17A
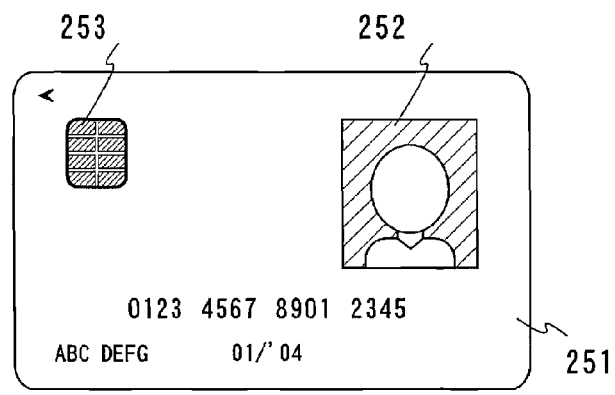
FIG. 17B
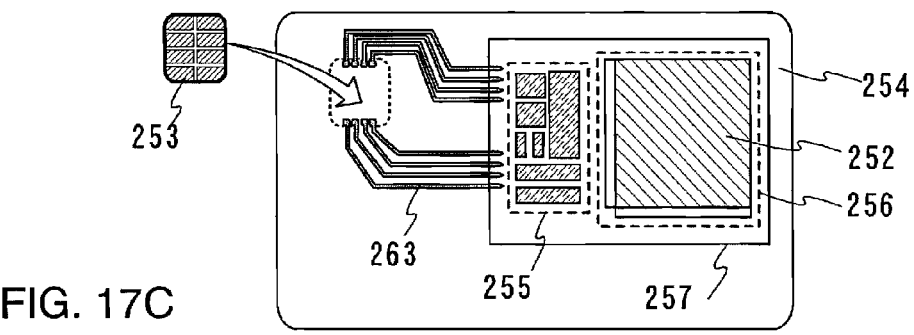
FIG. 17C
FIG. 17D
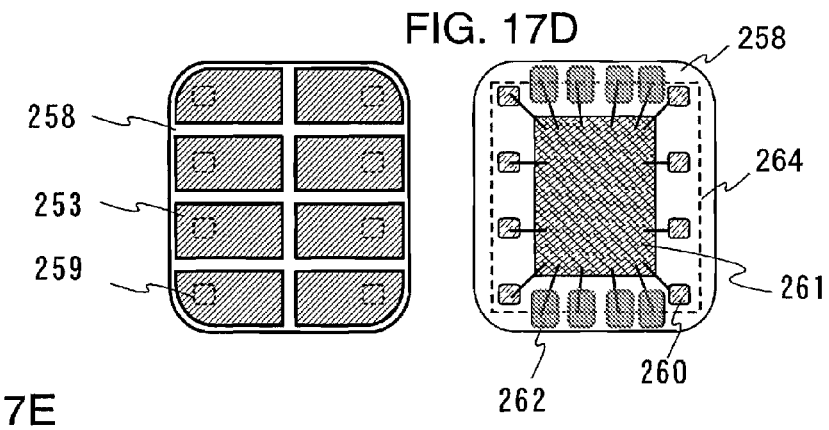
FIG. 17E
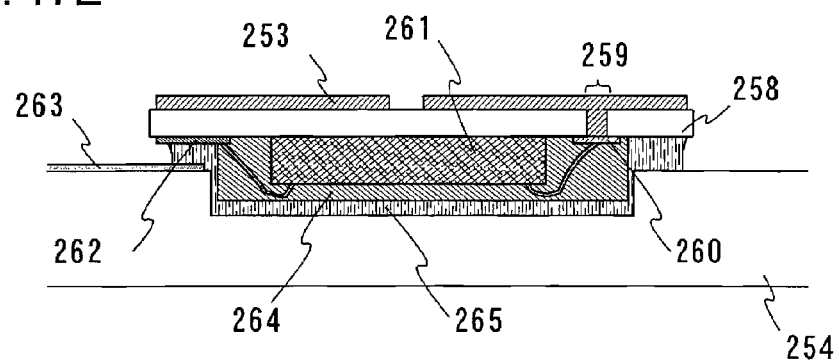

(a)

(b)

PAPER MONEY, COIN, VALUABLE INSTRUMENT, CERTIFICATES, TAG, LABEL, CARD, PACKING CONTAINERS, DOCUMENTS, RESPECTIVELY INSTALLED WITH INTEGRATED CIRCUIT

BACKGROUND OF THE INVENTION

1. Field of the Invention

The present invention relates to every product such as paper money, a coin, valuable instrument, certificates, a tag, a label, a card, packing containers, books, bearer bonds, vehicles, food items, garments, personal items, healthcare items, livingwares, medicals, a recording medium, or an electronic device, each of which can be distributed and installed with an integrated circuit having a memory or a microprocessor (central processing unit).

2. Related Art

In recent years, calls for enhancement of safety of products and improvement of a management system among an industrial world such as food industry, manufacture industry, and financial industry are heightened. Accordingly, an amount of information regarding the product becomes increased. Main product information at present is information on country of manufacture, a manufacturer, a product number, and the like provided from numbers of ten several digits of a barcode. In the case of using a barcode, reading requires much time since reading of the barcode is performed manually one by one. Consequently, automatic recognition technique by a noncontact IC tag utilizing an electromagnetic wave referred to as RFID (Radio Frequency Identification) has attracted attention instead of using a barcode system.

To secure the safety of animals and plants (for example, place of origin, the absence or presence of infectious disease, or the like), a system for obtaining and controlling information on the animals and plants has been diffused by reading information from an IC chip directly embedded in the body of the animals and plants with a reader device (reader) of outside the body.

In recent years, the number of cards carried by one person has been increased. Especially, a noncontact IC card for communicating with use of an electromagnetic field has been diffused in an electronic ticket form or an electronic money form.

To prevent reproduction or wrongful use of paper money, coins, valuable instruments, tickets, and the like due to counterfeit or theft of them, technique of embedding an IC chip in each of them has been diffused. (See Non Patent Document 1)

A communication principle of the conventional noncontact IC chip is explained with reference to FIG. 24. A product including a noncontact IC chip is held against an external device such as a reader/writer, and the noncontact IC chip receives an electromagnetic wave from the reader/writer, then, an electromotive force is generated by a resonance action, and then, the noncontact IC chip in an RFID tag starts operating. After the information in the chip is converted into signals, an antenna at the side of the noncontact IC chip transmits signals and an antenna of the reader/writer receives the sent signals. Then, the signals are sent to a data processing device such as a computer via a controller, and then, data processing such as identification is performed.

[Non Patent Document 1]
Nikkei Electronics, Nikkei Business Publications, pp. 67-76, Nov. 18, 2002.

Although a product having such the IC chip has been diffused, information on the product may be capable of being perceived, abstracted, falsified, or the like by a third person with his external device during the distribution of the product or after the purchase of the product. Further, it becomes increasingly serious when the product is thieved. There is possibility that information on the product is readily flowed and privacy is seriously infringed. In addition, there is also possibility that a counterfeit good, an imitation good, or wrongful use of products is increased due to the abstraction, the falsification, or the like of the flowed information.

Especially in the case that IC chips are mounted on products (regardless of movable property or immovable property) that enter almost distribution processes; human body; animals or plants; and the like in future, the foregoing problems become increasingly serious. Therefore, information installed to those IC chips is required to be protected.

SUMMARY OF THE INVENTION

In view of the foregoing, it is an object of the present invention to provide paper money, a coin, valuable instruments, certificates, a tag, a label, a card, packing containers, books, bearer bonds, vehicles, food items, garments, personal items, healthcare items, livingwares, medicals, a recording medium, an electronic device, and the like, each of which has a function of protecting information recorded and stored in an integrated circuit such as an IC chip installed to a product or the like.

Paper money, a coin, valuable instruments, certificates, a tag, a label, a card, packing containers, books, bearer bonds, vehicles, food items, garments, personal items, healthcare items, livingwares, medicals, a recording medium, an electronic device, or the like according to the present invention, each of which comprise an integrated circuit having at least a first nonvolatile memory and a second nonvolatile memory; wherein fixed information is stored in the first nonvolatile memory; and reading of information stored in the first nonvolatile memory and/or writing of new information to the integrated circuit can be controlled by rewriting information stored in the second nonvolatile memory.

Here, the second nonvolatile memory included in the integrated circuit serves as a switch or key for controlling reading and/or writing of information stored in the first nonvolatile memory. Therefore, the second nonvolatile memory is required to be a nonvolatile memory that can perform repeatedly erasing and writing of the contents of the second memory. Hereinafter, the memory that serves as a switch or key for controlling reading and/or writing of information stored in the integrated circuit such as the second nonvolatile memory may be referred to as a switching memory.

In manufacturing a product, for example, the second nonvolatile memory is formed by a rewritable nonvolatile memory, and information that serves as a key for reading the memory of the integrated circuit is written into the second nonvolatile memory. Then, product-specific information is written to the first nonvolatile memory. In this state, since information that serves as a key for reading the memory of the integrated circuit is written into the second nonvolatile memory, the product-specific information stored in the first nonvolatile memory can be read and/or rewritten. Further, a part of the product-specific information can be written into the second nonvolatile memory.

When a product is shipped from a manufacturer, the contents of the second nonvolatile memory is rewritten to make it impossible to be read (locked) the memory of the integrated circuit. By shipping the product in this state, the product-specific information is not perceived from outside during transportation. Even if the product is thieved, the product is not used wrongly or counterfeited and privacy is not infringed since the product-specific information cannot be read.

Both of the first and second nonvolatile memories may serve as switching memories to control reading and writing (lock, unlock) of the product-specific information stored in another memory in the integrated circuit. In this instance, the product-specific information can be doubly protected by rewriting (lock) both of the first and second nonvolatile memories in shipping. Alternatively, an arithmetic program of information of the first and second nonvolatile memories may be written in a program memory in the integrated circuit in such a way that lock and unlock of the product-specific information may be controlled by the arithmetic result. Further, three or more of nonvolatile memories serving as switching memories can be provided.

As a typical memory capable of erasing and writing memory, an EPROM (Erasable Programmable Read Only Memory) can be used. The EPROM can be broadly divided into an EEPROM (Electronically Erasable and Programmable ROM) that can erase memory electrically and a UV-EPROM (Ultra-Violet Erasable and Programmable ROM) that erases memory with ultraviolet rays. As a type of EEPROM, Flash Memory can be cited. The EEPROM can read and write by increments of one byte, whereas the Flash Memory can erase data collectively or by increments of blocks to write new data.

As a type of nonvolatile memory utilizing a ferroelectric substance, an FRAM (registered trademark, Ferroelectric Random Access Memory (also referred to as FeRAM)) can be used. As used herein, the term "ferroelectric substance" refers to a dielectric substance (a substance that stores charge by polarization and does not pass direct current) that can change freely the spontaneous polarization in a substance (the state of generating electric plus and minus in a substance) by voltage application and hold the polarization direction without voltage application. The FRAM has a characteristic that it can read and write at a speed of more than 10 times as high as a flash memory. Further, the FRAM is superior in reliability to the flash memory.

As the first nonvolatile memory storing the product-specific information, the foregoing EPROM or the like can be used in the case of rewriting the product-specific information more than once. On the contrary, ROM (Read Only Memory) can be used in the case of storing the information that is not required to be rewritten or that is not desired to be rewritten. As a type of the ROM, a mask ROM in which data is preliminarily formed as a circuit pattern of an IC can be used (The term "mask" is derived from an exposure pattern referred to as a mask which is used for forming an IC). The circuit pattern of an IC may be selectively formed by mask-less droplet discharging (typically, ink jetting).

Alternatively, a read-only PROM (Programmable Read Only Memory) in which a user (including not only a consumer and customer but also a transactor) can write information only at once by using a specialized device can be used. Information is generally recorded on the ROM in manufacturing, whereas information is not written into the PROM in manufacturing. A user records information on the PROM by using a ROM writer. When data is recorded at once, the written data cannot be changed or erased as in the case with the general ROM.

Since data is written in a circuit in the mask ROM at the time of manufacturing the mask ROM, reading out can be performed quickly (a user is not required to write) contrary to the PROM. Further, the costs of the mask ROM are low since a writing circuit or the like is not required. Therefore, the mask ROM is suitable for applications that can be preliminary expected to be in a great demand. The PROM is preferably used for limited production of diversified products, products requiring frequently bag patches in launching, or products required to be delivered within a short period.

As used herein, the term "integrated circuit" refers to every item that can serve to identify distributable movable property such as money or product; immovable property; animals or plants; human; or the like, or that can serve to store information on the foregoing items. The foregoing integrated circuit is referred to as an ID chip (Identification Chip), an IDF (ID Flexible) chip, an IC chip, or merely an IC.

The integrated circuit may be formed by an active element such as a transistor over a silicon wafer as an IC chip, or by an active element having a thin film laminated structure such as a TFT (thin film transistor) over an insulating substrate such as a glass substrate or a flexible substrate such as a plastic film.

Among a device utilizing an integrated circuit (referred to as an integrated circuit device or a semiconductor device), a device that communicates to an external reader/writer device (reader/writer) via a sending and receiving unit (antenna or antenna circuit) installed to the integrated circuit device by utilizing an electromagnetic field is referred to as a noncontact integrated circuit device. By the communication between the integrated circuit device and the reader/writer, information on products installed with the integrated circuit device can be identified, updated, controlled, and the like. An ID chip installed with a sending and receiving unit is referred to as a wireless chip.

On the other hand, a device that connects electrically a connecting terminal provided to an integrated circuit device to a reader/writer of a terminal device to send and receive data is referred to as a contact integrated circuit device. For example, a magnetic stripe type or an IC module contact type can be nominated as the contact integrated circuit device. In the case of contact IC, an antenna may not be provided. An integrated circuit device includes a combination structure of an integrated circuit device of a magnetic stripe type or an IC module contact type, and a noncontact integrated circuit device (hybrid type).

Needless to say, any of a noncontact type, a contact type, a hybrid type integrated circuit device can be applied to the present invention. Hereinafter, in the case of using merely the term "integrated circuit", it refers to any of a noncontact type, a contact type, a hybrid type integrated circuit device unless otherwise noted.

The foregoing paper money and coins refer to not only currency in the market but also a note that is in currency in a specific area as money (cash voucher). Further, the foregoing paper money and coins refer to memorial coins or memorial medals that are issued temporarily.

The forgoing valuable instruments include, but not exclusively, securities, a promissory note, a check, a stock certificate, bonds and debenture, and the like.

The foregoing certificates include, but not exclusively, a resident card, a copy of family register, an abstract of census register, an employee ID card, a student ID card, a member's card, an admission ticket to an examination, an admission ticket to a class, qualification, an identification card, and the like.

The foregoing tag refers to a label, a price card, a name card, a nameplate, and the like, each of which has a micro integrated circuit device utilized for identifying an object. The foregoing tag is also referred to as an ID tag. The ID tag stores information such as a private identification code. The ID tag includes any of a noncontact ID tag capable of sending and receiving information to/from a control system by using an electromagnetic wave, and a contact ID tag capable of connecting electrically a connecting terminal provided to an integrated circuit device to a read/writer of a terminal device to send and receive data, and a combination tag (hybrid ID tag) of both the contact ID tag and the noncontact ID tag.

The foregoing label refers to a seal, a sticker, a badge, an indicator, and the like, each of which has a micro integrated circuit device utilized for identifying an object. The label is also referred to as an ID label. The ID label includes any one of a noncontact type, contact type, and a hybrid type.

The foregoing card refers to every card such as a cash card, a credit card, a prepaid card, an electronic ticket, electronic money, a telephone card, a member's card, and the like, each of which has a micro integrated circuit device utilized for identifying an object. The foregoing card is also referred to as an ID card. The ID label includes any one of a noncontact type, contact type, and a hybrid type.

The foregoing packing containers refer to, but not exclusively, a wrapping paper, a packing bag, a packing bottle, a packing can, a packing box, a packing basket, a plastic bottle, a wrap, an aluminum foil, and the like.

The foregoing bearer bonds refer to, but not exclusively, a stamp, a ticket, an admission ticket, a merchandise coupon, a book coupon, a stationary coupon, a beer coupon, a rice coupon, various gift coupons, various service coupons, and the like.

The foregoing vehicles refer to, but not exclusively, a wheeled vehicle, a vessel, an airplane, a spaceship, and the like.

The foregoing food items refer to, but not exclusively, foods, beverages, nonessential grocery items, and the like, each of which can be ingested by human and animals.

The foregoing garments refer to everything that can be put on human body or animals such as clothing, clothing ornaments, and footwear.

The foregoing personal items refer to, but not exclusively, glasses, a watch, a bag, an umbrella, accessories, and the like.

The foregoing healthcare items refer to, but not exclusively, medical devices, and health appliances.

The foregoing livingwares refer to, but not exclusively, furniture, lighting apparatus, air conditioner, stationary, table wares, and the like.

The foregoing recording medium refers to, but not exclusively, a TV game software, DVD software, a video tape, a CD, an MD, a DAT, a cassette tape, a floppy disk, a CD-ROM, a memory card, a program, and the like.

The foregoing medicals refer to not only medicines but also medicated cosmetics, agricultural chemicals, fertilizer, insecticide, chemicals, and the like.

The foregoing electronic device refers to, but not exclusively, a liquid crystal display device (LCD); an EL display device; a plasma display; a television receiver that includes two-way communication television; a radio; an electronic calculator; a telephone; a cellular phone; a PDA (portable digital assistance having communication function); a device for recording of sound, recording of a picture or reproducing, such as a record, CD, MD, DAT, DVD, cassette tape, and video tape; electronic book; and the like.

A product according to the present invention such as paper money is installed with an integrated circuit including at least two or more of nonvolatile memories, wherein one of nonvolatile memory stores specific information. The reading and writing (lock, unlock) of the foregoing one of the nonvolatile memory can be controlled by rewriting information stored in the other nonvolatile memory. The access to the information can be restricted especially in a distribution process, that is, product-specific information can be prevented from being perceived from outside. Even if the product is thieved, the product is not used wrongfully or counterfeited. Further, privacy is not invaded since the product-specific information cannot be read.

In the case of using a plurality of nonvolatile memories as a switching memory, unlawful access to product-specific information can be prevented doubly or triply.

These and other objects, features and advantages of the present invention will become more apparent upon reading of the following detailed description along with the accompanied drawings.

BRIEF DESCRIPTION OF THE DRAWINGS

FIG. 6 is an explanatory view of a method for managing paper money, coins, and the like according to the present invention in a financial institution or the like;

FIGS. 17A to 17E are explanatory views of a contact ID card including a display portion;

DESCRIPTION OF THE INVENTION

Embodiment 1

A method for controlling reading and writing of product-specific information by using one switching memory is explained in this embodiment. In this embodiment, the case that a noncontact integrated circuit is used is especially explained.

Figure 1:
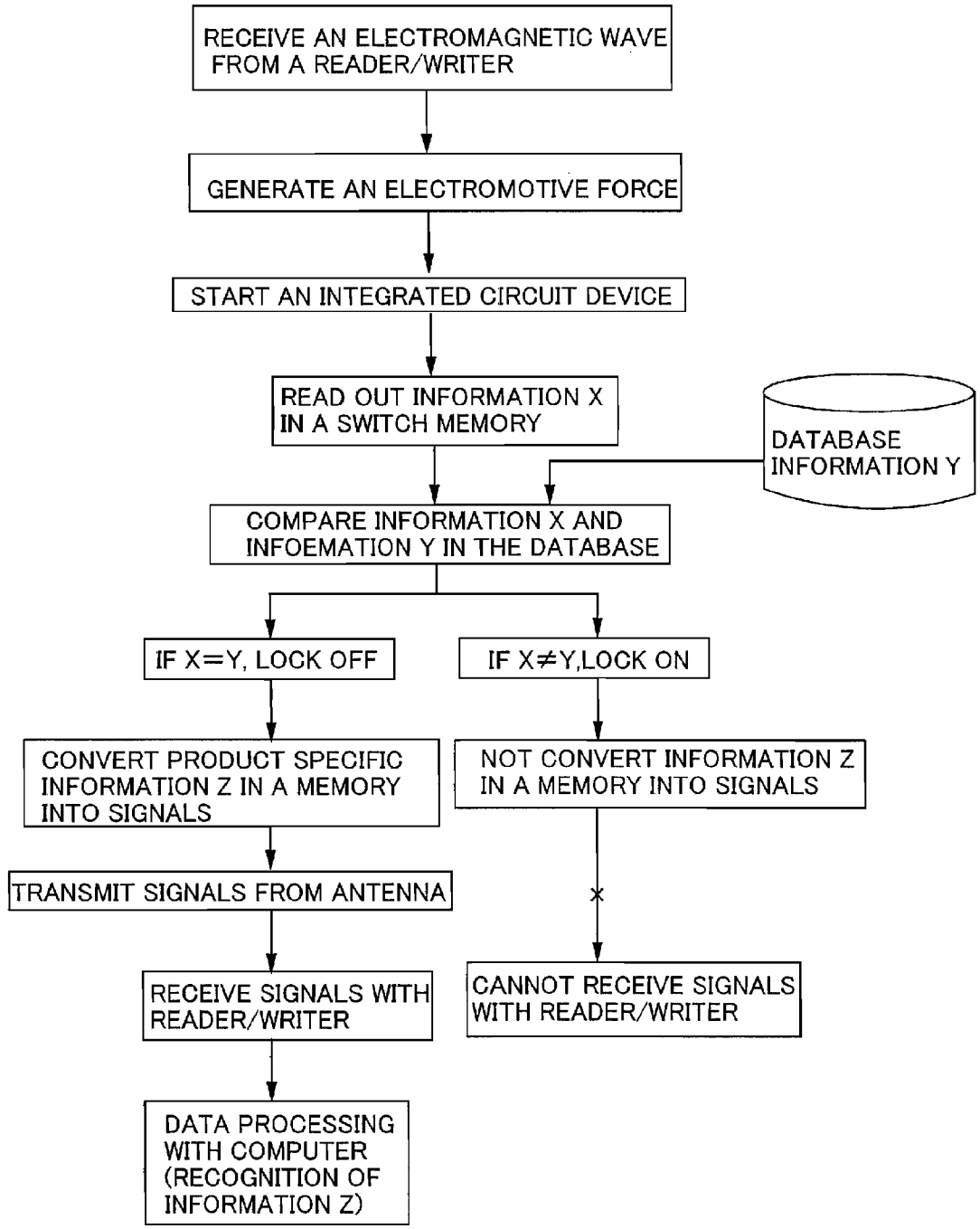
FIG. 1 is a flow diagram for showing a method for identifying information included in a product according to the present invention.

FIG. 1 is a flow diagram for showing a method for controlling reading and writing product-specific information by using one switching memory. A product including an IC chip is held against an external machine such as a reader/writer, and a noncontact integrated circuit device receives an electromagnetic wave from the reader/writer, then, an electromotive force is produced by a resonance action, and then, an integrated circuit starts operating. As a method for producing the electromotive force, electromagnetic induction, electromagnetic coupling, or the like can be used. The electromagnetic induction is a method that an electromagnetic wave oscillated from the reader/writer is converted into electric energy in an antenna of the noncontact integrated circuit device, and data can be sent and received. The electromagnetic coupling is a method that a magnetic field is generated from a coil at the side of the reader/writer, and the noncontact integrated circuit device is brought to be close to the reader/writer, a magnetic line in the noncontact integrated circuit device passes through the coil, voltage is produced, and the integrated circuit can start operating by the produced voltage.

Figure 2:
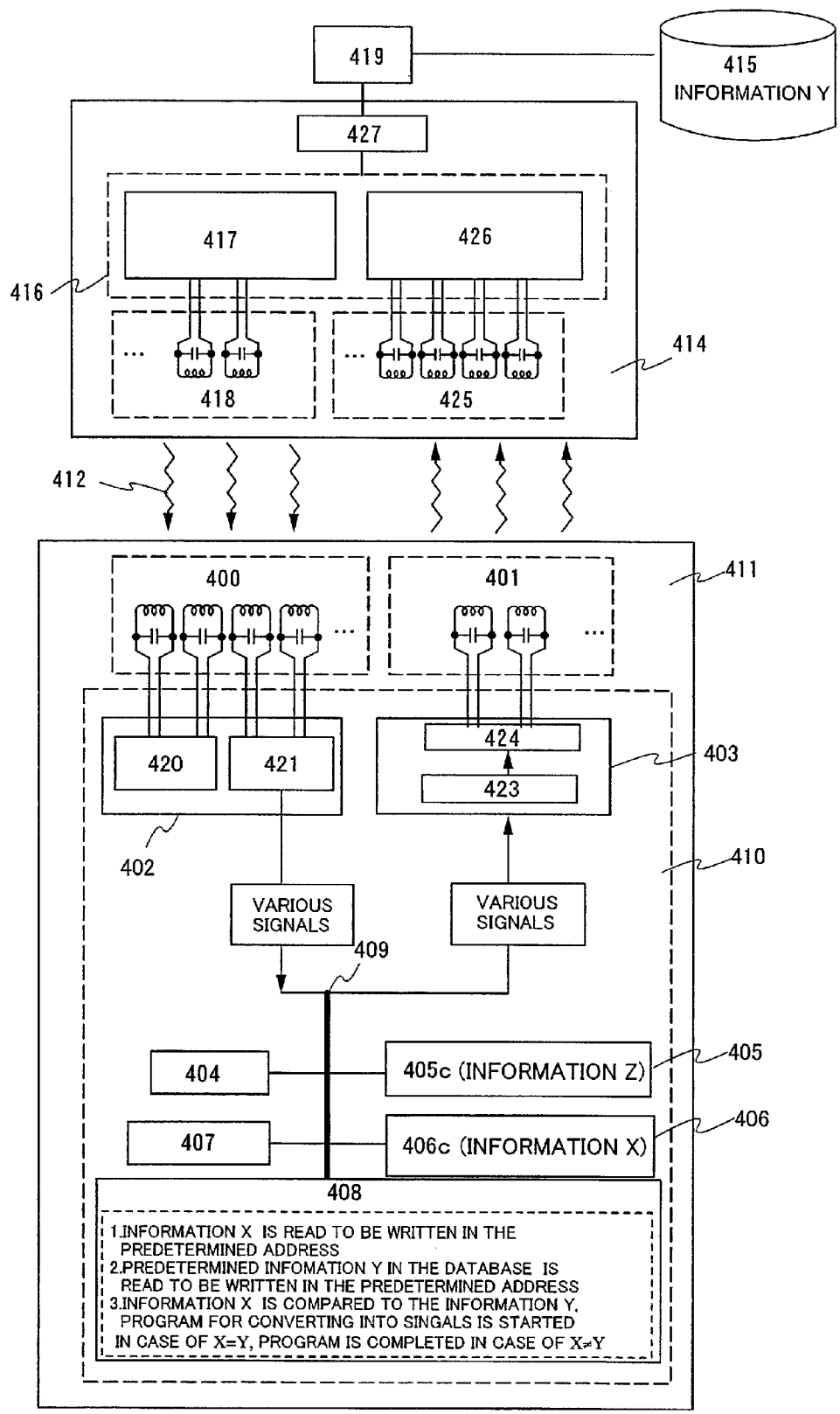
FIG. 2 is a block diagram for showing an integrated circuit (noncontact type) device installed to a product according to the present invention.

Upon starting operating the integrated circuit, information stored in a switching memory (hereinafter, information X) is read out to check the information X against information on a product for a switching memory, which is stored in a database (hereinafter, information Y), and which is read into an integrated circuit via an antenna coil. The information X is read into a computer 419 via the reader/writer to be checked on the computer 419 against information Y stored in a database 415 connected to the computer 419, preferably (FIG. 2). As a result, a lock is released in the case of corresponding information X to information Y, that is, product-specific information (hereinafter, information Z) stored in another memory can be read out, or the information can be erased to rewrite new information.

So large amount of information that cannot be specified on a container or a label of a product, for example, a production place, a sales territory, quality, a raw material, an effect, usage, the number of the product, the form of the product, a price, a production method, directions of use, time of production, a period of using, an expiration date, an instruction manual, intellectual property right information on the product, and the like can be inputted as the information Z.

To read out the information Z, the information Z in a memory of the integrated circuit is converted into signals in a circuit referred to as an instruction decoder in a CPU, and the signals are transmitted from an antenna at the side of the noncontact integrated circuit device to receive the transmitted signals by an antenna of the reader/writer. Then, the signals are sent to a data processing device such as a computer via a controller, and then, data processing such as identification is carried out. Accordingly, the information Z can be read out. (Refer to left side flow diagram in FIG. 1.)

On the other hand, in the case that the information X does not correspond to the information Y, the product-specific information Z can be prevented from being converted to signals to be transmitted to the reader/writer by programming in such a way that the CPU in the integrated circuit cannot access to the information Z in a program memory, that is, the access to the information Z is kept locked. Hence, it cannot read out the information Z to identify. Further, the information Z cannot be erased and new information cannot be written since the access to the information Z is kept locked. (Refer to right side flow diagram in FIG. 1.)

Therefore, the product-specific information Z can be prevented from being accessed by a third person by rewriting the information X into another information so that the information X does not correspond to the information Y. As a result, counterfeit and wrongful use of products can be prevented as well as being privacy protected.

A method, which is this embodiment, for controlling reading and writing of product-specific information by using one switching memory in a noncontact integrated circuit device is explained in further specific with reference to FIG. 2.

FIG. 2 is a block diagram for showing a noncontact integrated circuit device. Reference numeral 400 denotes an input antenna coil; 401, an output antenna coil; 402, an input interface; and 403, an output interface. The number of various antenna coils is not limited to the number of those illustrated in FIG. 2. An electromagnetic wave 412 that is modulated in an output interface 417 in a reader/writer 414 and that is received from an output antenna coil 418 by the input antenna coil 400 is modulated and converted into direct current in the input interface 402 to be supplied via a bus 409 to various circuits such as a CPU 404, a first nonvolatile memory 405c that is a data memory 405, a second nonvolatile memory 406c that is a switching memory 406, a working memory 407, and a program memory 408.

The first nonvolatile memory stores the product-specific information Z. In the case that the information should be rewritten more than once, the already described EPROM, EEPROM, UV-EPROM, flash memory, FRAM, and the like can be used. On the contrary, in the case that the information that is not required to be rewritten or that is not desired to be rewritten is to store, an ROM (for example, a mask ROM), a PROM, or the like can be used.

The second nonvolatile memory stores the information X that becomes a key for controlling reading and writing of the information Z. Since the information X is required to be modified appropriately in a distribution process, an EPROM, an EEPROM, an UV-EPROM, a flash memory, an FRAM, or the like, each of which can rewrite the information more than once, is preferably used.

The program memory is a space for storing a program. As illustrated in FIG. 2, for example, a program for controlling reading and writing of the information Z is conducted in accordance with the following procedure. First, the information X is read to be written in a predetermined address; second, predetermined information Y in the database is read to be written in a predetermined address; and third, the information X is compared to the information Y, and a program for converting into signals is started in case of X=Y, or the program is completed in case of X≠Y. As the program memory, an ROM is generally used.

The work memory is a space for saving data temporarily in a process of program execution. The data memory is a space for storing fixed data dealt by a program as well as product-specific information. As the work memory, an RAM (Random Access Memory), which serves as a work area for data processing, is generally used. In addition, the RAM serves as a buffer for communicating to the reader/writer. To store data inputted as a signal to a determined address, the EEPROM is generally used.

Although not shown in the drawings, a coprocessor (processor that helps a CPU serving as a main computer for controlling all kinds of processing of the integrated circuit 410) may be provided. The coprocessor can serve as an instruction execution unit for only code processing to carry out code processing that is required to run an application such as settlement.

According to a program, the CPU compares the information X to the information Y in the database 415 which is read via the reader/writer. In the case that X=Y, the product-specific information Z is converted into signals in the foregoing various circuits and modulated in the output interface 403 to be sent to the reader/writer 414 by the output antenna coil 401.

The input interface 402 is provided with a rectification circuit 420 and a demodulation circuit 421. Alternating power supply voltage inputted from the input antenna coil 400 is rectified in the rectification circuit 420 and supplied to the foregoing various circuits as direct-current power supply voltage. Alternating various signals inputted from the input antenna coil 400 are demodulated in the demodulation circuit 421. The alternating various signals are shaped in a waveform by the demodulation, and are supplied to the foregoing various circuits.

Further, the output interface 403 is provided with a modulation circuit 423 and an amplifier 424. The various signals inputted to the output interface 403 from the various circuits are modulated in the modulation circuit 423, and amplified, or buffered and amplified in the amplifier 424, then, sent to a terminal device such as a reader/writer from the output antenna coil 401. The signals transmitted from the noncontact integrated circuit device are received by the input antenna coil 425 of the reader/writer, modulated in the input interface 426, and sent to the computer 419 via a controller 427 to be data-processed in the computer 419. Accordingly, the product-specific information Z can be identified. Note that, reference number 416 denotes an integrated circuit.

The foregoing computer 419 has software having a function of processing information on products; however, information processing can be carried out by hardware. As a result, the merchandise management can be readily carried out since time and labor for information processing is reduced and mistakes can also be reduced compared to the work of reading one by one a barcode in a conventional way.

One mode of the various circuits illustrated in FIG. 2 is illustrative only. The various circuits mounted on the noncontact integrated circuit device 411 and on the reader/writer 414 are not limited to the foregoing circuits.

An example of using an antenna coil for a noncontact type is explained in FIG. 2. However, a noncontact type is not limited thereto. A data may be sent and received by light with a light-emitting element, a light sensor, or the like.

In FIG. 2, the input interface 402 and the output interface 403, each of which includes analog circuits such as the rectification circuit 420, the demodulation circuit 421 and the modulation circuit 423; the CPU 404; various memories; and the like are formed by one integrated circuit 410. The structure is illustrative only, and so the present invention is not limited thereto. For example, the input interface 402 and the output interface 403, each of which includes analog circuits such as the rectification circuit 420, the demodulation circuit 421 and the modulation circuit 423, can be provided to the integrated circuit 410; and the CPU 404, various memories, and the like can be formed by a thin film integrated circuit composed of a TFT.

In the case of using a TFT, the thin film integrated circuit can be manufactured by forming a TFT over a glass substrate via a peeling layer, and printing the TFT on a substrate or a film, or the like. In the case that the TFT is peeled from the substrate, the TFT can be peeled physically by stressing the layer to be peeled (stress peeling), or the TFT can be peeled chemically by etching. A peeled TFT element can be pasted onto a desired position in the noncontact integrated circuit device by using a vacuum small-size tweezers or an extremely small tweezers.

An example in which power supply voltage is supplied from a reader/writer that is a terminal device is explained with reference to FIG. 2. However, the present invention is not limited to the example. Although not shown, solar battery may be provided to the noncontact integrated circuit device. Alternatively, an extremely thin battery such as lithium battery may be installed to the noncontact integrated circuit device.

Embodiment 2

A method for controlling reading and writing of product-specific information by using two switching memories is explained in this embodiment. In this embodiment, the case of using a noncontact integrated circuit device is especially explained.

Figure 3:
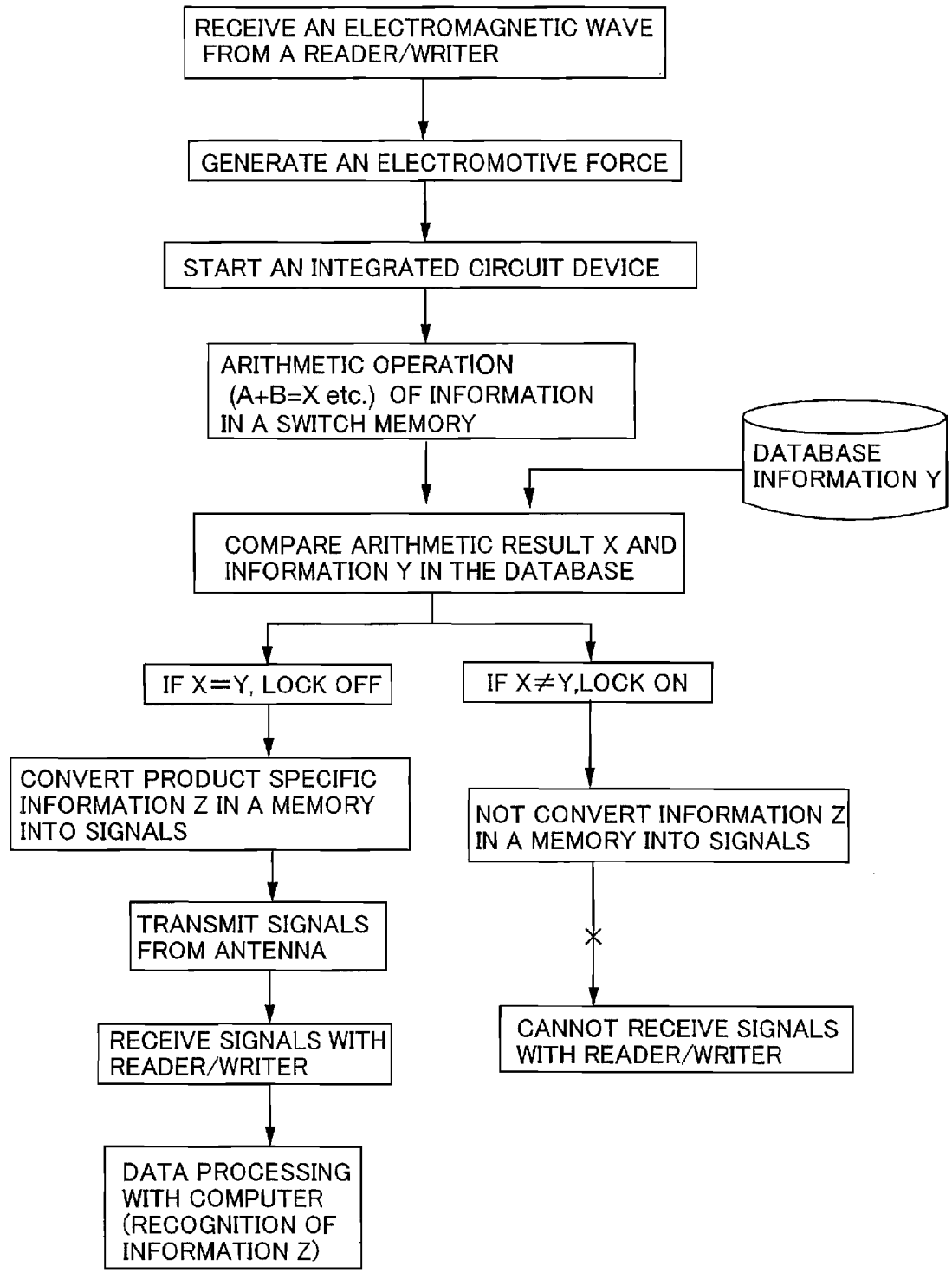
FIG. 3 is a flow diagram for showing a method for identifying information included in a product according to the present invention.

FIG. 3 is a flow diagram for showing a method for controlling reading and writing of product-specific information by using two switching memory. A product including an IC chip is held against an external machine such as a reader/writer, and a noncontact integrated circuit device receives an electromagnetic wave from the reader/writer, then, an electromotive force is produced by a resonance action, and then, an integrated circuit starts operating. As a method for producing the electromotive force, electromagnetic induction, electromagnetic coupling, or the like can be used.

Figure 4:
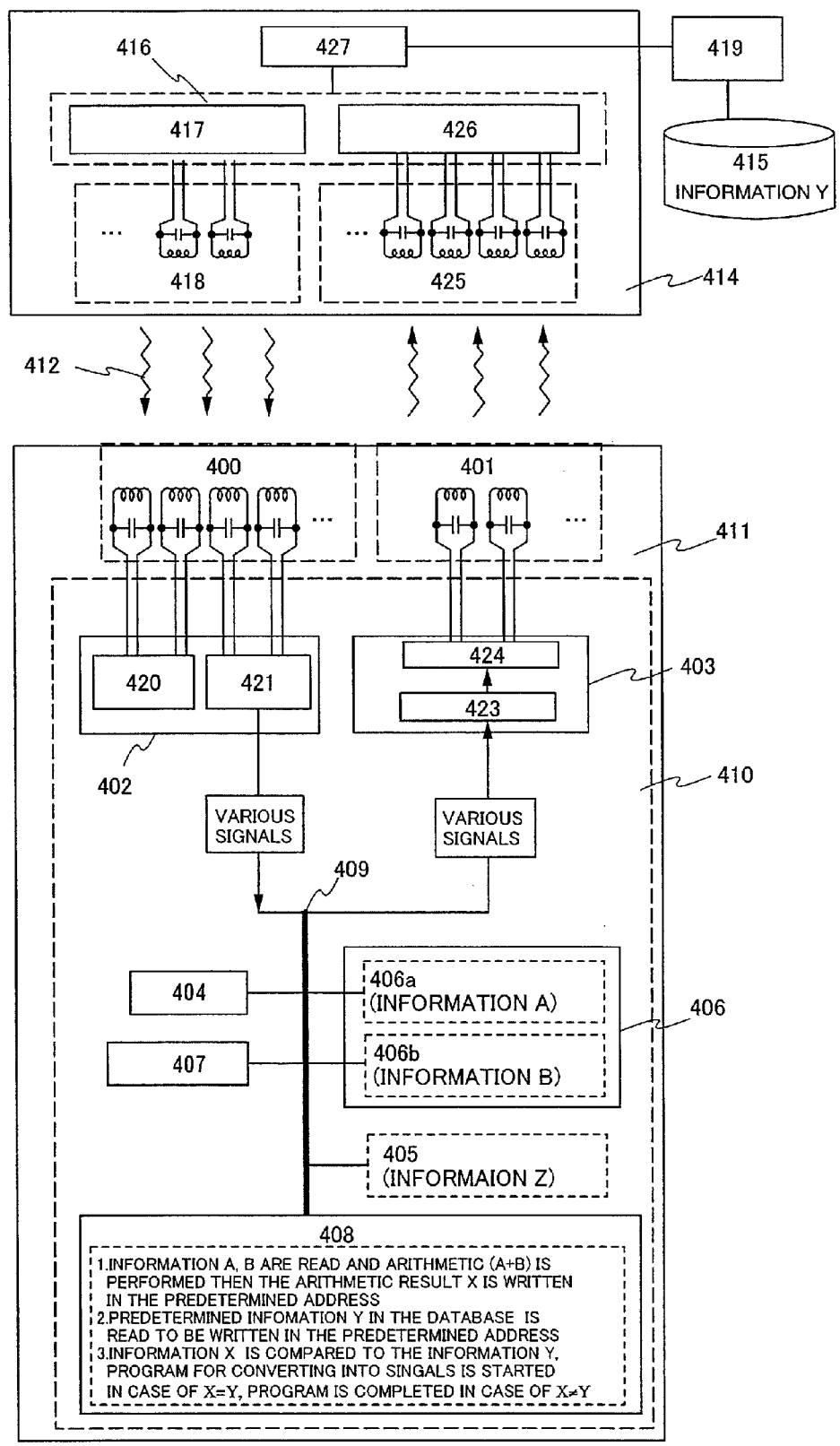
FIG. 4 is a block diagram for showing an integrated circuit (noncontact type) device installed to a product according to the present invention.

Upon starting operating the integrated circuit, information stored in two switching memories (information A, information B) is read out. An arithmetic processing result based on a predetermined program (hereinafter, information X) is obtained. The information X is checked against information on a product for a switching memory, which is stored in a database (hereinafter, information Y), and which is read into an integrated circuit via an antenna coil. The information X is read into a computer 419 via the reader/writer to be checked on the computer 419 against the information Y stored in a database 415 connected to the computer 419, preferably (FIG. 4). As a result, a lock is released in the case that the information X corresponds to the information Y, that is, product-specific information (hereinafter, information Z) stored in another memory can be read out, or the information can be erased to rewrite new information.

To read out the information Z, the information Z in a memory of an integrated circuit 416 is converted into signals in a circuit referred to as an instruction decoder, and the signals are transmitted from an antenna at the side of the noncontact integrated circuit device to receive the transmitted signals by an antenna of the reader/writer. Then, the signal are sent to a data processing device such as a computer via a controller, and then, data processing such as identification is carried out. Accordingly, the information Z can be read out. (Refer to left side flow diagram in FIG. 3.)

On the other hand, in the case that the information X does not correspond to the information Y, the product-specific information Z can be prevented from being converted to signals to be transmitted to the reader/writer by programming in such a way that the CPU in the integrated circuit cannot access to the information Z in a program memory, that is, the access to the information Z is kept locked. Hence, it cannot read out the information Z to identify. Further, the information Z cannot be erased and new information cannot be written since the access to the information Z is kept locked. (Refer to right side flow diagram in FIG. 3.)

Therefore, the product-specific information Z can be prevented from being accessed by a third person by rewriting at least one of the information A and B into another information so that the arithmetic processing result information X does not correspond to the information Y. As a result, counterfeit and wrongful use of products can be prevented as well as being privacy protected.

As used herein, the term "arithmetic" refers to various kinds of operation and its combination such as addition, subtraction, multiplication, division, square root, and square. Further, the object information of the arithmetic is not limited to two pieces information; two or more pieces of object information can be used.

A method, which is this embodiment, for controlling reading and writing of product-specific information by using two switching memories in a noncontact integrated circuit device is explained in further specific with reference to FIG. 4.

FIG. 4 is a block diagram for showing a noncontact integrated circuit device. Reference numeral 400 denotes an input antenna coil; 401, an output antenna coil; 402, an input interface; and 403, an output interface. The number of various antenna coils is not limited to the number of those illustrated in FIG. 4. An electromagnetic wave 412 that is modulated in an output interface 417 in a reader/writer 414 and that is received from an output antenna coil 418 by the input antenna coil 400 is modulated and converted into direct current in the input interface 402 to be supplied via a bus 409 to various circuits such as a CPU 404, a data memory 405, a switching memory 406 (a first nonvolatile memory 406a and a second nonvolatile memory 406b), a working memory 407, and a program memory 408.

The data memory stores the product-specific information Z. In the case that the information should be rewritten more than once, the already described EPROM, EEPROM, UV-EPROM, flash memory, FRAM, and the like can be used. On the contrary, in the case that the information that is not required to be rewritten or that is not desired to be rewritten is to store, an ROM (for example, a mask ROM), a PROM, or the like can be used. The data memory is a space for storing fixed data dealt by a program as well as product-specific information.

The first and second nonvolatile memories store the information A and B that becomes a key for controlling reading and writing of the information Z. Since at least either of the information A and B that is required to be modified appropriately in a distribution process, an EPROM, an EEPROM, an UV-EPROM, a flash memory, an FRAM, or the like, each of which can rewrite the information more than once is preferably used. The first and second nonvolatile memories are preferably rewritable.

The program memory is a space for storing a program. As illustrated in FIG. 4, for example, a program for controlling reading and writing of the information Z is conducted in accordance with the following procedure. First, the information A, B is read out, and arithmetic processing of the information A, B is performed, then, the result of the arithmetic processing is written in a predetermined address; second, predetermined information Y in the database is read to be written in a predetermined address; and third, the information X is compared to the information Y, and a program for converting into signals is started in case of X=Y, or the program is completed in case of X≠Y. As the program memory, an ROM is generally used.

The work memory is a space for saving data temporarily in a process of program execution. As the work memory, an RAM (Random Access Memory), which serves as a work area for data processing, is generally used. In addition, the RAM serves as a buffer for communicating to the reader/writer. To store data inputted as a signal to a determined address, the EEPROM is generally used.

Although not shown in the drawings, a coprocessor (processor that helps a CPU serving as a main computer for controlling all kinds of processing of the integrated circuit 410) may be provided.

According to a program, the CPU compares the information X to the information Y in the database 415 which is read via the reader/writer. In the case that X=Y, the product-specific information Z is converted into signals in the foregoing various circuits and modulated in the output interface 403 to be sent to the reader/writer 414 by the output antenna coil 401.

The functions of the input interface 402 and the output interface 403 are mentioned in Embodiment 1.

The various circuits illustrated in FIG. 4 are illustrative only. The various circuits mounted on the noncontact integrated circuit device 411 and on the reader/writer 414 are not limited to the foregoing circuits.

An example of using an antenna coil for a noncontact type is explained in FIG. 4. However, a noncontact type is not limited thereto. A data may be sent and received by light with a light-emitting element, a light sensor, or the like.

In FIG. 4, the input interface 402 and the output interface 403, each of which includes analog circuits such as the rectification circuit 420, the demodulation circuit 421, and the modulation circuit 423; the CPU 404; various memories; and the like are formed by one integrated circuit 410. The structure is illustrative only, and so the present invention is not limited thereto. The input interface 402 and the output interface 403, each of which includes analog circuits such as the rectification circuit 420, the demodulation circuit 421, and the modulation circuit 423, can be provided to the integrated circuit 410; and the CPU 404, various memories, and the like can be formed by a thin film integrated circuit composed of a TFT.

In the case of using a TFT, the thin film integrated circuit can be manufactured by forming a TFT over a glass substrate via a peeling layer, and printing the TFT on a substrate or a film, or the like. A method for printing is carried out in accordance with that explained in Embodiment 1.

An example that power supply voltage is supplied from a reader/writer that is a terminal device is explained with reference to FIG. 4. However, the present invention is not limited to the example. Although not shown, solar battery may be provided to the noncontact integrated circuit device. An extremely thin battery such as lithium battery may be installed to the noncontact integrated circuit device.

Figure 5:
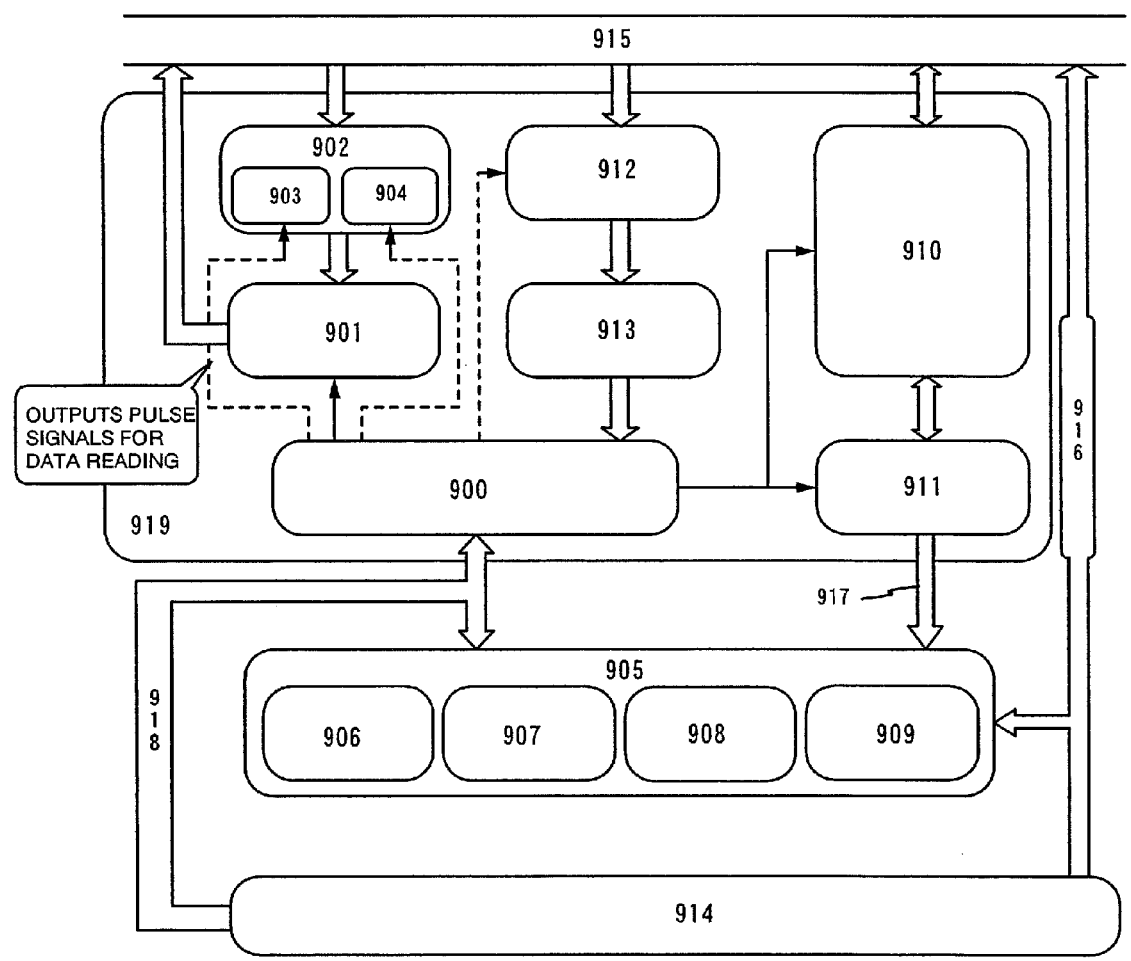
FIG. 5 is an explanatory block diagram of a structure of a CPU in an integrated circuit device.

A configuration of a CPU in the integrated circuit device is briefly explained with reference to FIG. 5. FIG. 5 is a block diagram for showing an integrated circuit composed of a CPU, a memory, and an input output interface 914. The CPU, the memory and the input output interface are connected with each other by a control bus 918.

Since work of reading an instruction from a program memory 906 in a main memory 905 is indispensable for the CPU 919, an address in which the instruction is presented is required to be assigned via an address bus 917. An address control unit 911 assigns an address to such a main memory 905.

Upon assigning an address to the program memory 906, an instruction stored in the address is outputted, and the outputted instruction is taken once in an instruction register 912 via a data bus 916 and an internal bus 915. As used herein, the term "register" refers to a storing element for work of maintaining data within a CPU or an execution state. Various kinds of processing are performed by using the register. The register group 910 is used for maintain data except taken in the instruction register 912, or an execution state.

The instruction taken in once the instruction register is sent to an instruction decoder 913. The instruction decoder 913 translates the received instruction to convert it into control information that can be understood by the control unit 900, and gives instructions for what the control unit 900 to do. The instruction decoder 913 gives instruction about the location (register or memory) of information to be processed according to instructions. As used herein, the term "translation" refers to conversion of data composed of a plurality of input signals (bit) into a specified signal.

An instruction from the instruction decoder 913 to the control unit 900 is given by signals. The control unit has signal lines (control signals) for controlling a circuit that performs various kinds of processing corresponding to kinds of information. The control signals are attached with switching circuit respectively. The control signals can be outputted to the circuit when the switch of switching circuit is turned ON.

In case that the contents of the instruction relate to arithmetic, the control unit 900 outputs control signals of arithmetic operation (pulse signals for data reading) to a computing unit 901. An arithmetic register 902 that becomes an object of arithmetic is divided into two registers, that is, an arithmetic object and an arithmetic subject. In this embodiment, two pieces of the information A and the information B are objects of arithmetic operation. In the case that arithmetic operation of A+B is performed, A is an arithmetic object and B is an arithmetic subject. An arithmetic result is not written in a B register 904 but an A register 903 that is an arithmetic object.

The main memory 905 includes the program memory 906, a work memory 907, a data memory 908, and a switch memory 909. The functions of various memories are described above. The input output interface 914 serves to convert signals having different standards to processable signals for a CPU when the CPU communicates with an external device (for example, reader/writer).

Embodiment 3

Figure 6:
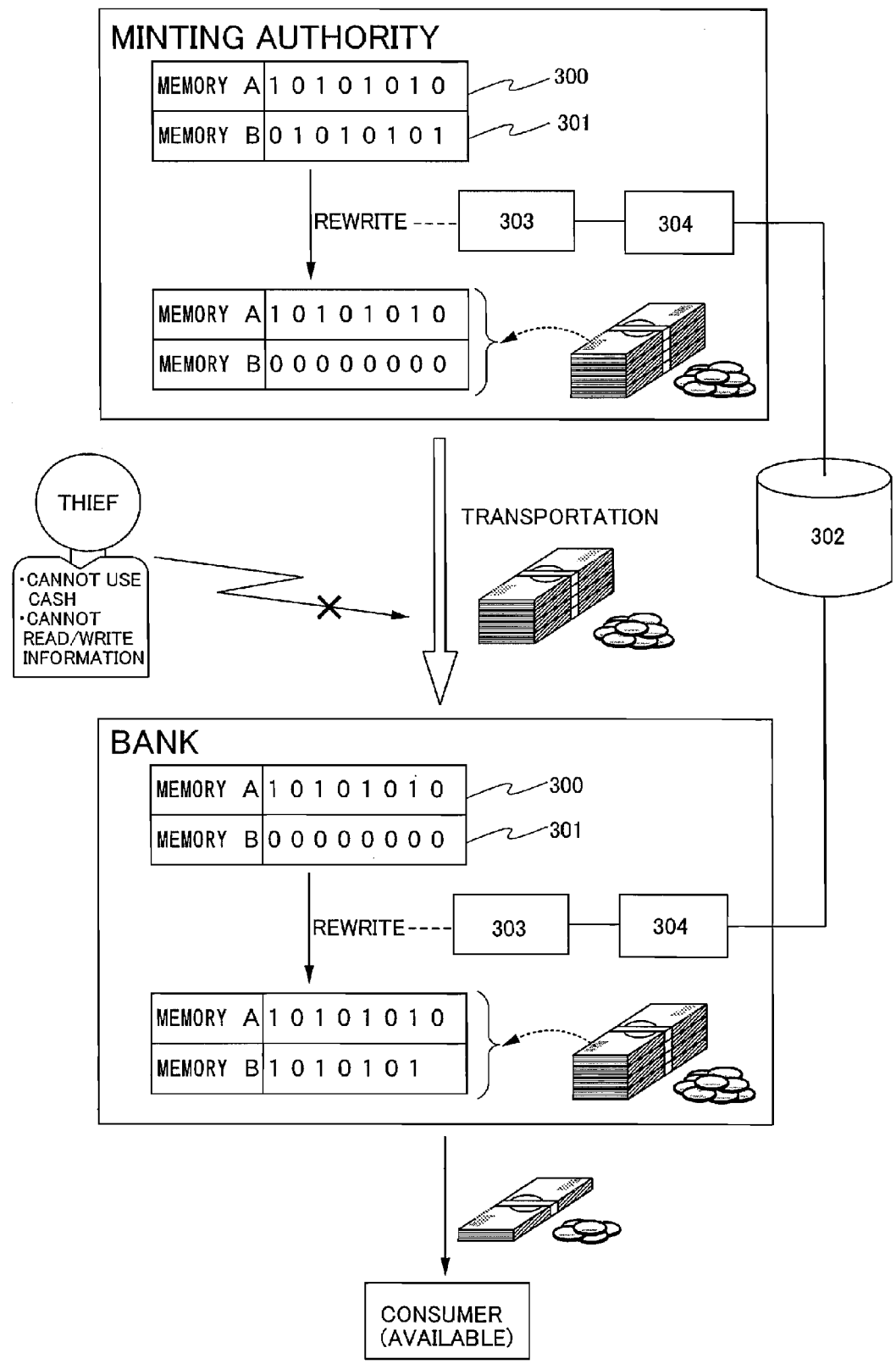

The usage pattern of paper money or a coin, each of which is installed with an integrated circuit according to present invention, is explained in this embodiment with reference to FIG. 6.

At the time of manufacturing paper money or a coin, product-specific information 300 (corresponding to information Z, included in a first nonvolatile memory explained in Embodiment 1) and rewritable information 301 (corresponding to information X included in a second nonvolatile memory (switch memory) explained in Embodiment 1) is written in the paper money or the coin by a reader/writer 303. Simultaneously, the information 300 and the information 301 is saved in a database 302 via a computer 304. In consideration with the fact that the information 301 is made to be rewritable again, the correspondence is made clear in the database, so that the information 300 on cash can be precisely obtained from the manufacturing date, the manufacturing time, the flight numbers for transportation, or the like. In order to store the information 300, not only a read only memory can be used but also a read write memory may be used. Further, in order to store the information 301, the information 301 may be stored by preparing a plurality of switch memories as in the case with Embodiment 2.

When cash such as paper money is transported to various financial institutions such as a bank, an automated teller machine (ATM), a store, and the like, the information 301 is erased or rewritten to another information by a reader/writer. At this time, the information 300 cannot be read since the information 301 is rewritten to be locked. If a system by which cash cannot be used unless the information 300 can be read is adopted in each store, the information 300 cannot be read from cash even if the cash is stolen by a thief during transporting cash. Accordingly, the thief cannot use the cash. Therefore, wrongful use after cash is stolen can be prevented.

Since cash-specific information stored in cash cannot be read, counterfeit paper money or coins installed with an integrated circuit device cannot be manufactured. If the foregoing counterfeit paper money or coins installed with an integrated circuit device can be manufactured, they cannot be used unless the information stored therein accords to information stored in a database.

After transporting and delivering cash to a bank or the like, the information 301 stored in a database 302 is rewritten to information that is the same as that in manufacturing in the bank and the like via the reader/writer 303 and the computer 304. Accordingly, in the case that consumer receives the cash storing the rewritten information 301 and uses the cash, manufacturing information can be recognized at a store or the like. Accordingly, the cash can be used.

This embodiment can be applied to not only paper money or coins but also every product installed with an integrated circuit device according to the present invention.

Embodiment 4

Figure 7:
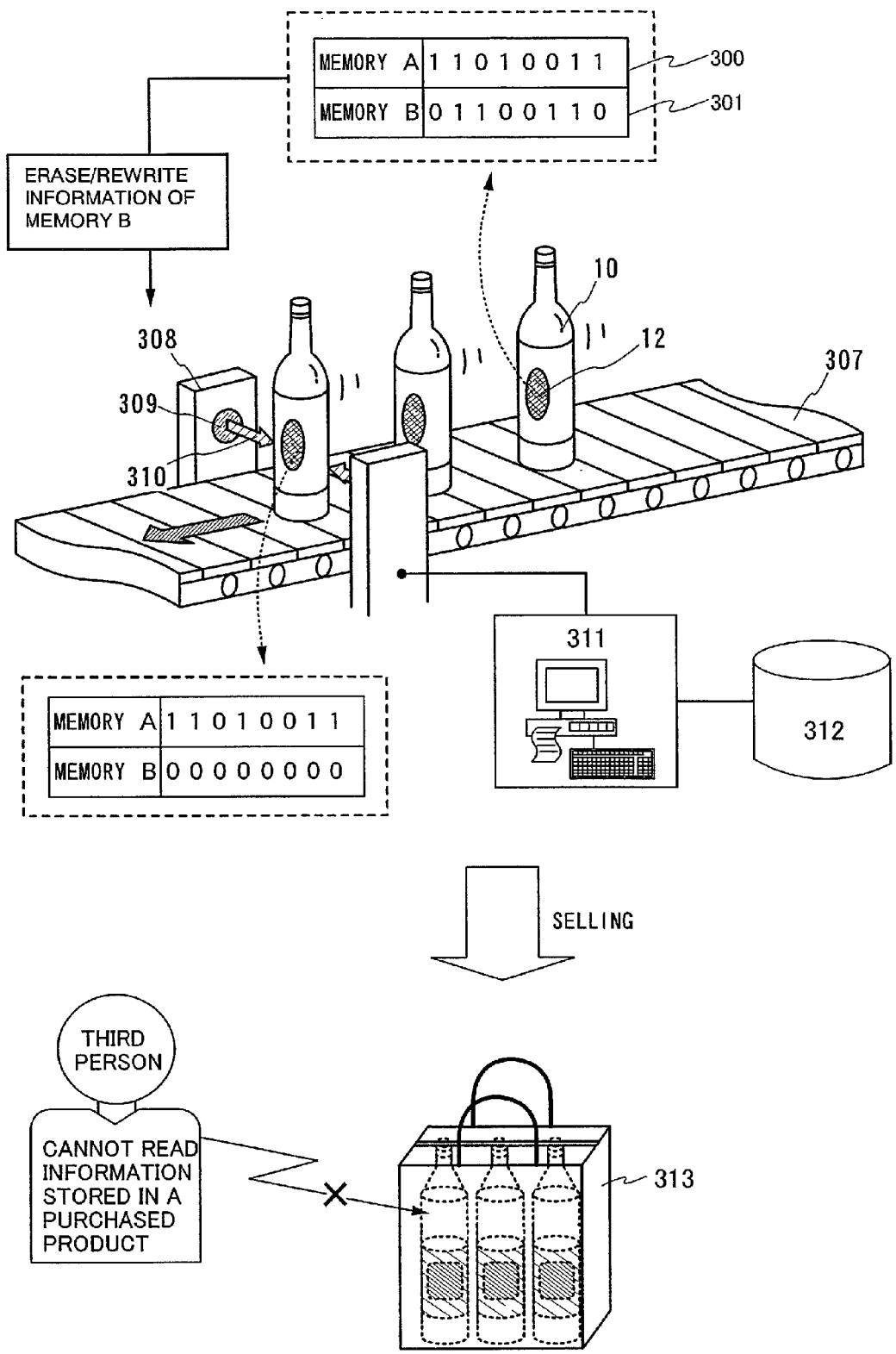
FIG. 7 is an explanatory view of a method for managing a product according to the present invention in purchasing the product.

The usage pattern of various products installed with integrated circuit devices according to the present invention is explained with reference to FIG. 7 in this embodiment, especially in purchasing.

When purchasing a product 10 that stores product-specific information 300 of a memory A and rewritable information 301 of a memory B in manufacturing the product 10 at stores, the information 301 is erased or rewritten to another information by a checkout counter, a conveyor 307, or the like with an electric wave 310 from a reader/writer antenna 309 of a reader/writer 308. At this time, the rewritable information is saved in a database 312 via a computer 311. The information 300 cannot be read since the information 301 is rewritten to be locked at this point. Accordingly, the information 300 stored in a purchased product put in a packing container 313 such as a bag or a box cannot be accessed even if a third person has an external device such as a reader/writer. Therefore, abstraction of information or invasion of privacy can be prevented since the external device cannot access to the information 300.

Needless to say, this embodiment can be applied to not only a bottled beverage but also every product installed with an integrated circuit device according to the present invention. So large amount of information that cannot be specified on a container or a label of a product, for example, a production place, a sales territory, quality, a raw material, an effect, usage, the number of the product, the form of the product, a price, a production method, time of production, a period of using, an expiration date, an instruction manual, intellectual property right information on the product (patent property relating to the product), and the like can be inputted as the product-specific information 300.

Embodiment 5

Figure 8:
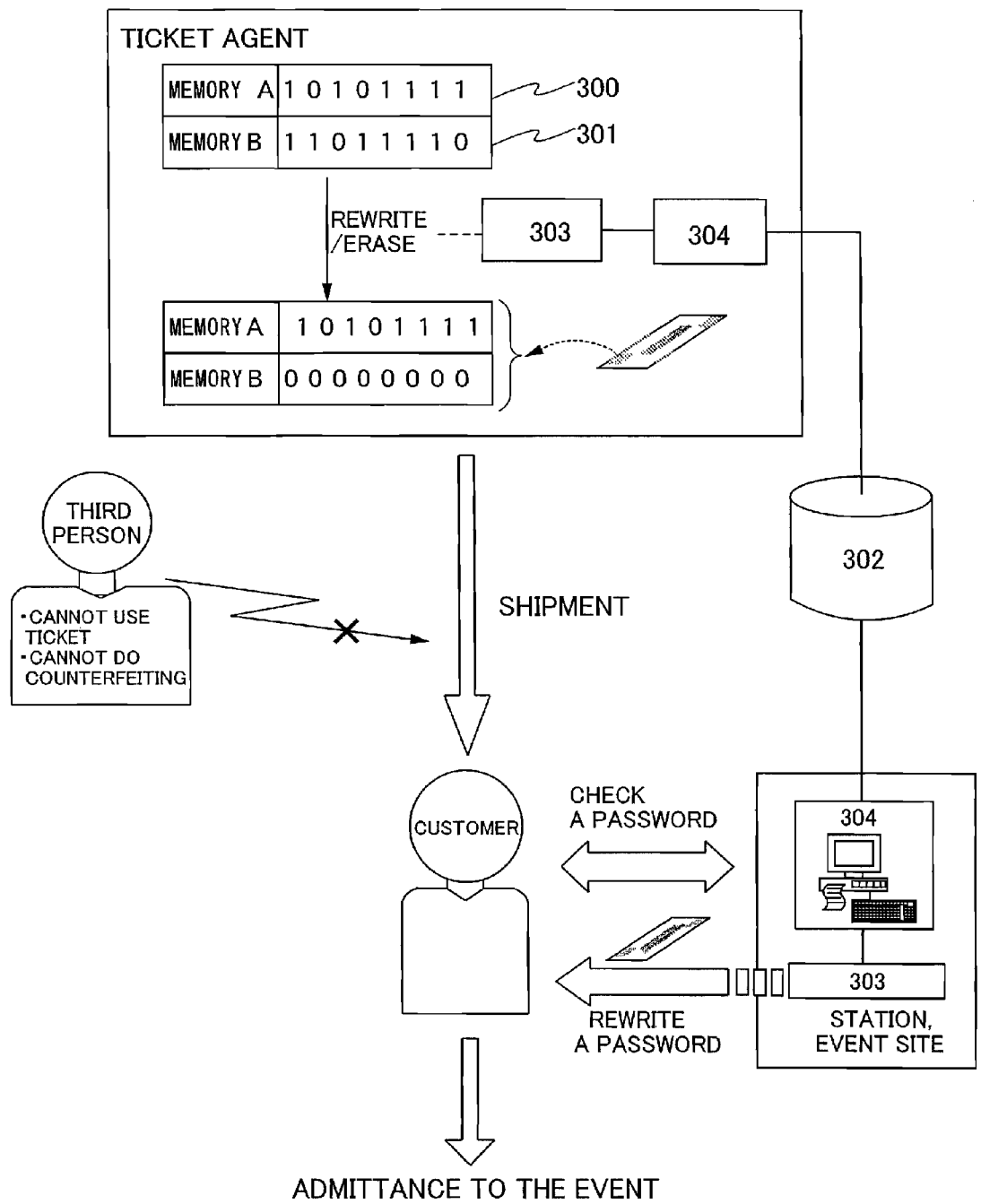
FIG. 8 is an explanatory view of a method for managing a ticket according to the present invention.

The usage pattern of so-called bearer bonds such as a ticket or a railway ticket installed with an integrated circuit device according to the present invention is explained with reference to FIG. 8 in this embodiment.

At the time of issuance of a ticket, ticket-specific information 300 of a memory A and rewritable information 301 of a memory B is inputted to the ticket. Further, the rewritable information 301 is saved in a database 302. In addition, the information 301 may serve as a customer's password. The ticket-specific information 300 stores an event name, an event organizer, a date and place of the event, and the like.

At the time of selling, sending, or the like the ticket, the information 301 is erased or rewritten to another information by a reader/writer 303. The information 300 cannot be read since the information 301 is rewritten to be locked at this time. Accordingly, even if a customer loses the ticket or the ticket is stolen after a seller sends the ticket or the customer purchases the ticket, a third person cannot access to the information 300 and the information 301 by an external device such as a reader/writer. Therefore, wrongful use or counterfeit of the ticket can be prevented.

In the case that a ticket purchaser (customer) participates actually in an event such as an entertainment, the purchaser brings a ticket in which the information 301 is erased or rewritten to the event site and checks a password to verify identity. Then, the reader/writer 303 rewrites the information 301 (the information 301 may serve as a password). Accordingly, the ticket purchaser can obtain admittance to the event.

Example 1

In this example, a method for reading information in a product installed with an integrated circuit device (ID label, ID tag, or the like) according to the present invention is explained with reference to FIGS. 10A to 10C. Further, a noncontact integrated circuit is explained in this example.

Figure 10A:
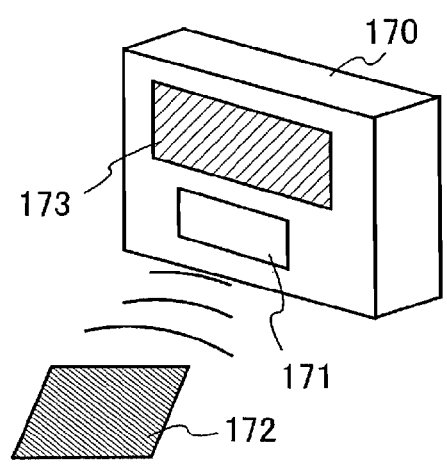
FIGS. 10A to 10C are explanatory views of an example of a reader/writer.

A product 172 installed with an ID label or an ID tag is held against a sensor portion 171 of a reader/writer main body 170 as illustrated in FIG. 10A. A display portion 173 displays the raw material, the place of origin, and a producing (manufacturing) process-based test result or history of a distribution process of the product, moreover, information relating to the product such as the description of the product. Needless to say, the display portion is not always required to the reader/writer. The display portion may be separately provided. Such the reader/writer may be on store shelves that display products.

Figure 10B:
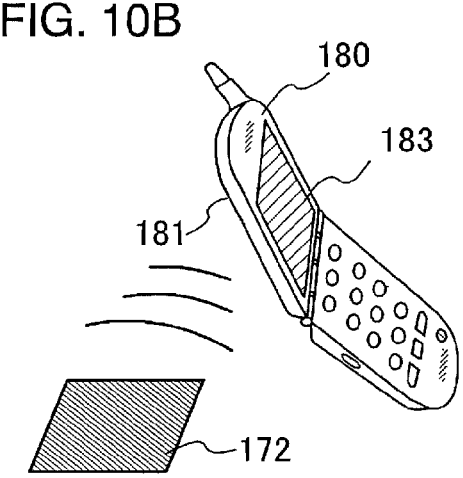

As illustrated in FIG. 10B, a reader function is installed to a personal digital assistance, for example, a cellular phone main body 180, and a product 172 installed with an ID label or an ID tag is held against a sensor portion 181 provided to a part of the main body to display information on a display portion 183. Simultaneously, information on the product is displayed on the display portion 183. Needless to say, the display portion is not always required to the reader/writer. The display portion may be separately provided.

Figure 10C:
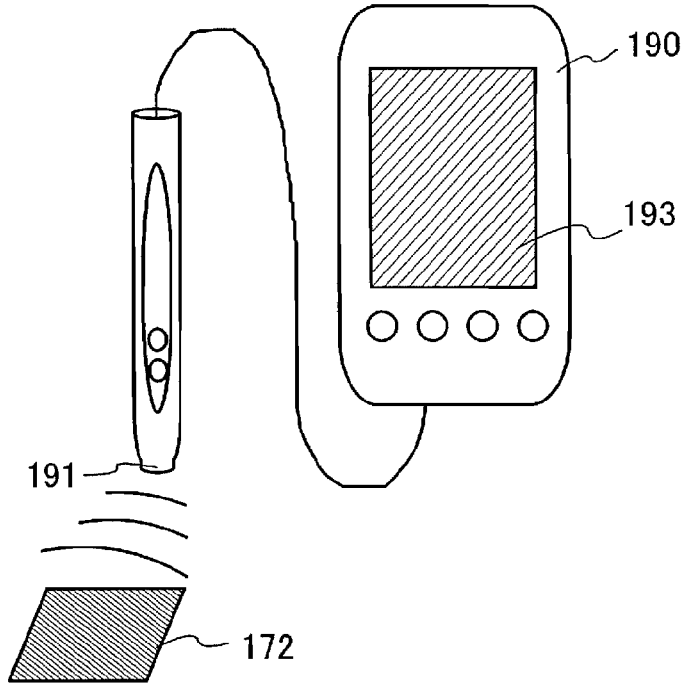

As illustrated in FIG. 10C, a product 172 installed with an ID label or an ID tag is held against a sensor portion 191 of a personal portable reader main body 190 to display information on a display portion 193. Simultaneously, information on the product is displayed on the display portion 193. Needless to say, the display portion is not always required to the reader/writer. The display portion may be separately provided.

In example, a noncontact reader/writer is explained. In case of a contact reader/writer, information may be displayed on a display portion. A display portion may be provided to a product itself installed with a noncontact or contact integrated circuit to display information.

Compared to information provided by the conventional wireless tag or the like, a customer can obtain freely voluminous information on products. Needless to say, accurate merchandise management can be made quickly by using an integrated circuit device.

In the case of installing a noncontact integrated circuit device according to the present invention to a product, the noncontact integrated circuit device is divided into four categories of a close coupling IC card, a proximity IC card, a vicinity IC card, and a remote IC card. The close coupling IC is an electromagnetic induction type which has communications distance of 0 to 2 mm, and which uses a communication frequency of 4.92 GHz. The proximity IC card is an electromagnetic induction type which has communications distance of approximately 10 cm, and which uses a communication frequency of 13.56 MHz. The vicinity IC card is an electromagnetic induction type which has communications distance of approximately 70 cm, and which uses a communication frequency of 13.56 MHz. The remote IC card is a microwave type having communications distance of approximately several meters.

The characteristic of the noncontact integrated circuit is that electric power is supplied by electromagnetic induction (electromagnetic induction type) of a coiled antenna, mutual induction (electromagnetic coupling type), or induction by electrostatic (electrostatic coupling type). By controlling the number of antenna windings, the level of frequency being received can be selected. For instance, the number of antenna windings can be reduced by increasing the frequency and reducing a wavelength.

Compared to a contact integrated circuit, the noncontact integrated circuit carries out power supply and information communication without contacting a reader/writer, and so the noncontact integrated circuit is not broken, has high resistance, and does not generate error due to electrostatic or the like. Further, the structure of a reader/writer becomes not complicated. Therefore, the noncontact integrated circuit is easy to use since all one has to do is holding the integrated circuit against the reader/writer.

Example 2

An example of products and the like according to the present invention is explained with reference to FIGS. 11A to 15B

Figure 11A:
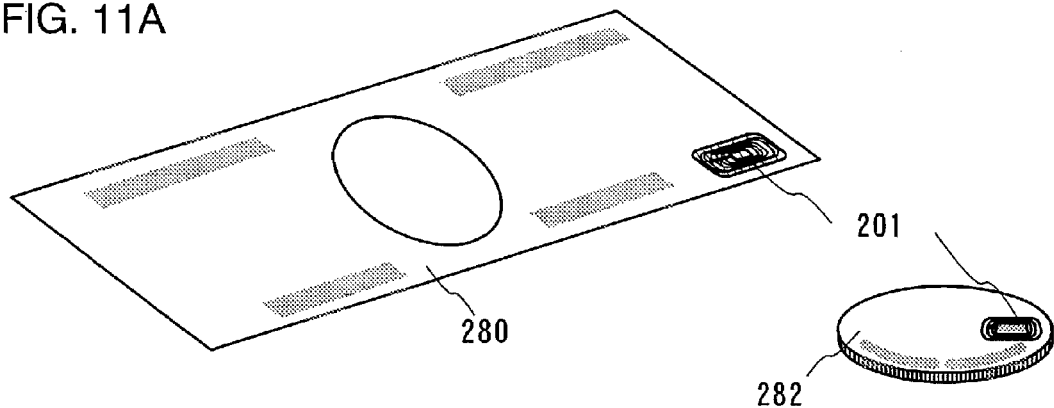
FIGS. 11A to 11D are explanatory views of an example of a product according to the present invention.
Figure 11B:
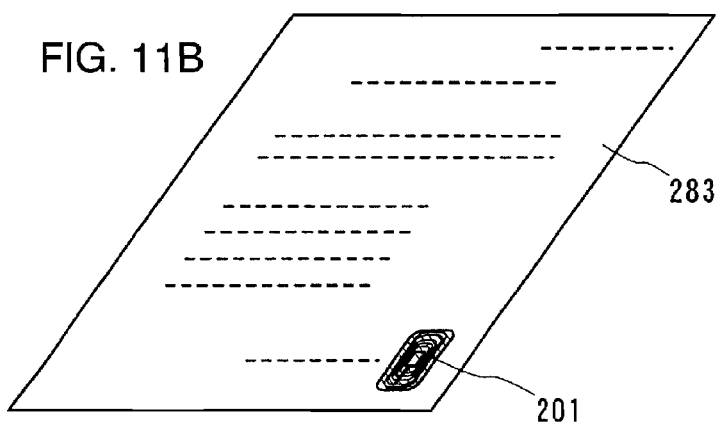
Figure 11C:
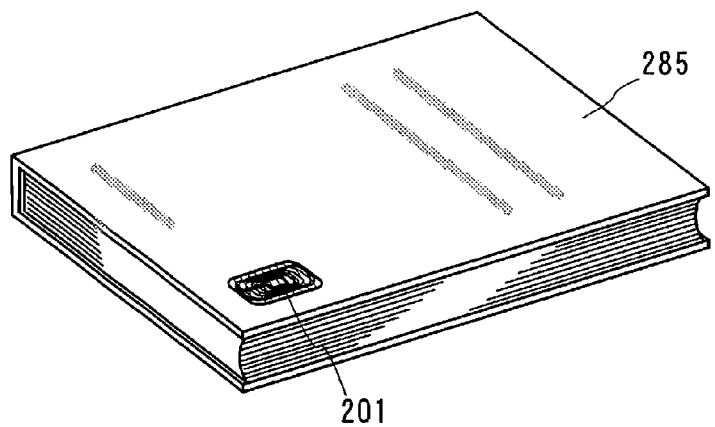
Figure 11D:

FIG. 11A illustrates an item 280 such as paper money, a certificate, a ticket, or a traveler's check, each of which is installed with an integrated circuit device 201; and an item 282 such as a coin or a medal, each of which is installed with the integrated circuit device 201. FIG. 11B illustrates a certificate 283 such as a family register or a residency card, each of which is installed with the integrated circuit device 201. FIG. 11C illustrates a book 285, which is installed with the integrated circuit device 201. FIG. 11D illustrates a bearer bond 286 such as a merchandise coupon, which is installed with the integrated circuit device 201.

An integrated circuit can be installed to items such as the foregoing paper money, coin, document, or book without detriment to damage its functions or design since a noncontact or contact integrated circuit according to the present invention is extremely thin. In case of using the noncontact integrated circuit, an antenna and the integrated circuit can be integrally formed. Accordingly, the integrated circuit becomes readily to be directly printed on a product having a curved surface.

Figure 12A:
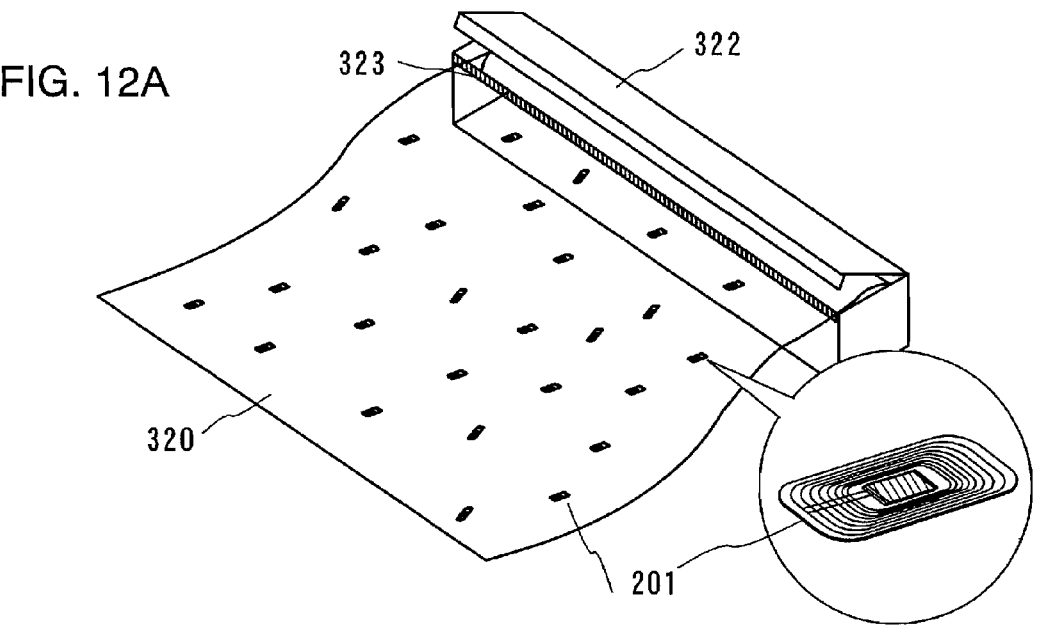
FIGS. 12A to 12D are explanatory views of an example of a product according to the present invention.

FIG. 12A illustrates a packing film 320 such as a wrap or aluminum foil, each of which is installed with the integrated circuit device 201. As a method for forming the packing film 320, a method that a number of the integrated circuit devices 201 are formed, the integrated circuit devices are dispersed randomly over a lower film, and the integrated circuit devices are coated by an upper film, but not exclusively, can be used. The packing film may be put in a box 322 having a cutter 323 as illustrated in FIG. 12A.

Figure 9A:
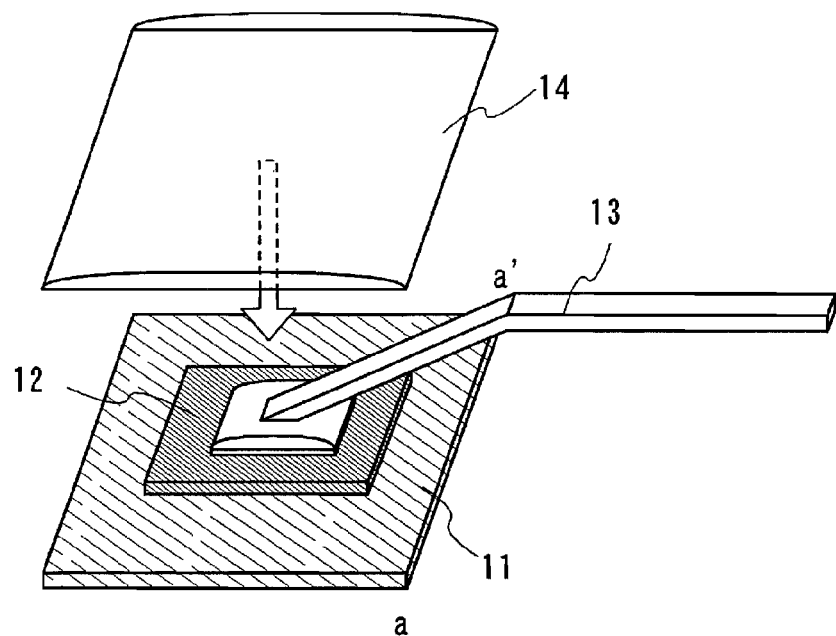
FIGS. 9A and 9B are explanatory views of a method for pasting an integrated circuit device onto a product.
Figure 9B:
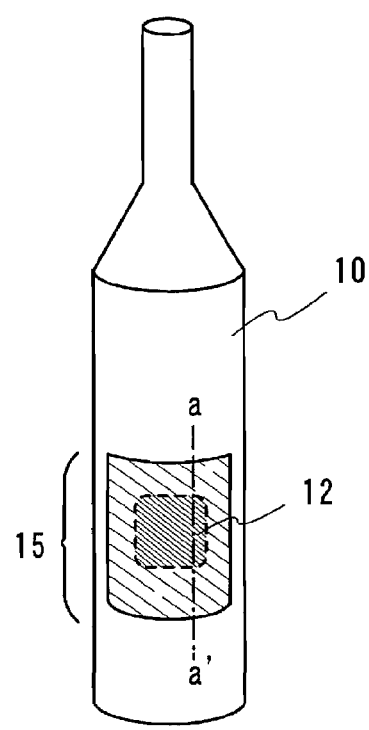
Figure 12B:
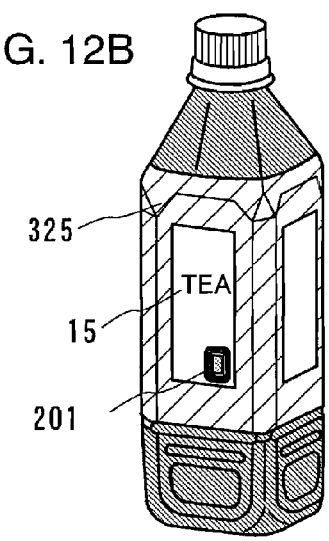
Figure 12C:
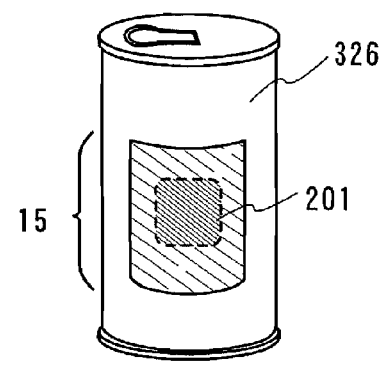
Figure 12D:
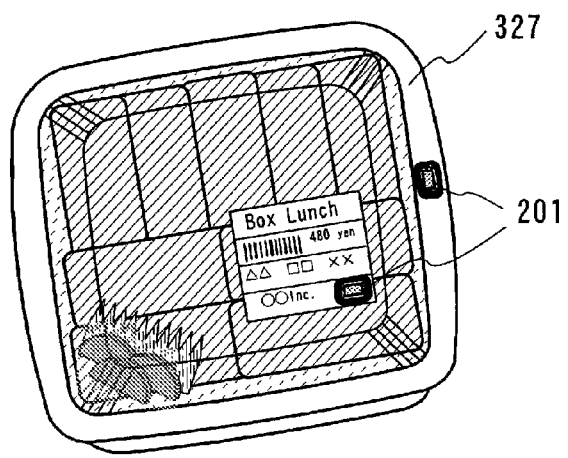

FIGS. 12B to 12D illustrate the state that various products pasted with ID labels installed with integrated circuits 201. Here, a method for manufacturing the ID label according to the present invention is explained with reference to FIGS. 9A and 9B. An IC chip manufactured over a silicon wafer, or an integrated circuit device 12 such as thin film integrated circuit manufactured by using a TFT is transported by a small-size vacuum tweezers 13, a micro-size pin, or the like to mount on a desired position of a label 11. The integrated circuit device 12 is pasted onto the label 11 by the small-size vacuum tweezers 13, and sealed by an adhesive 14. Accordingly, an ID label 15 is completed. Further, an ID label 15 is attached to a product 10. Hence, the product 10 can be completed in which information can be recognized, updated, and controlled via a reader/writer or the like.

As an example of the product 10 attached with the ID label 15, a plastic bottle 325 illustrated in FIG. 12B, a can juice 326 illustrated in FIG. 12C, a box lunch 327 shown in FIG. 12D can be nominated. Needless to say, the ID label can be used for all other products.

Figure 13A:
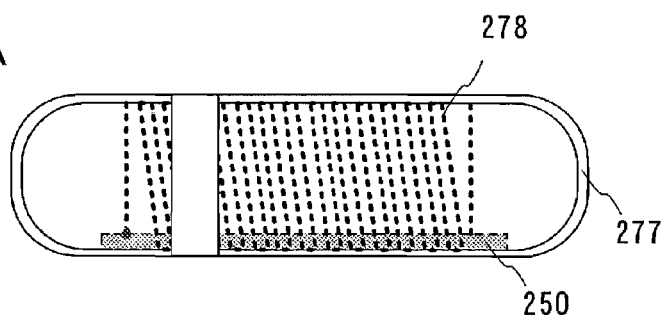
FIGS. 13A to 13E are explanatory views of an example of a product according to the present invention.
Figure 13B:
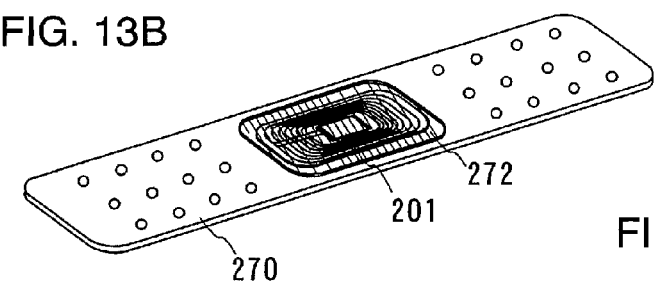
Figure 13C:
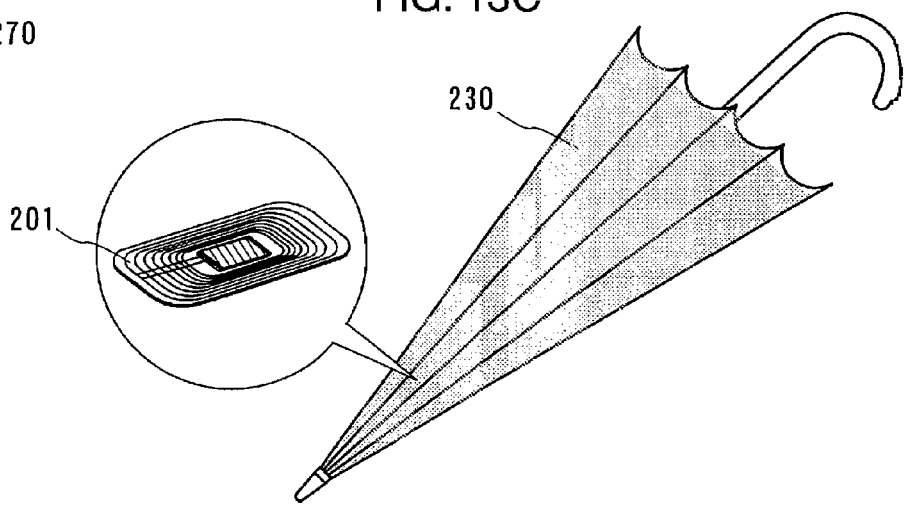
Figure 13D:
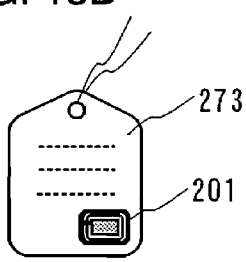
Figure 13E:
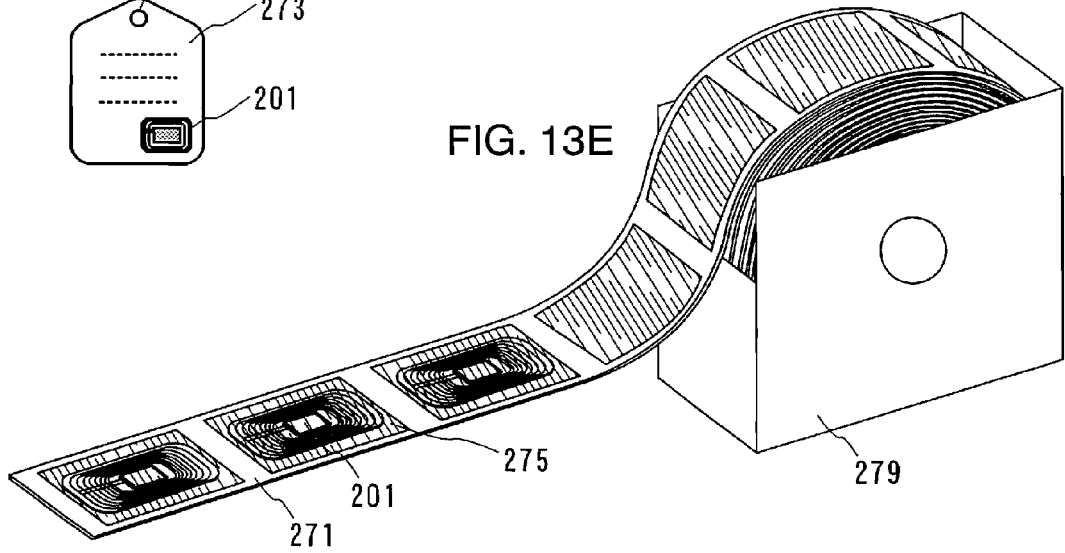

FIG. 13E illustrates an ID label 275 installed with the integrated circuit device 201, a label board 271 attached with the ID label 275, and a box 279 storing the label board 271. Information on the products or service of the products (product name, brand name, trademark, owner of the trademark, seller, manufacturer, and the like) is written on the ID label. On the other hand, the installed integrated circuit is attached with a product-specific ID number (or a product-kind-specific number). Accordingly, the forgery, the infringement of the intellectual property right such as trademark right or patent, or a dishonest act such as unfair competition can be readily known. Further, so large amount of information that cannot be specified on a container or a label of a product, for example, a production place, a sales territory, quality, a raw material, an effect, usage, the number of the product, the form of the product, a price, a production method, directions of use, time of production, a period of using, an expiration date, an instruction manual, intellectual property right information on the product, and the like can be inputted to the integrated circuit device. A transactor or consumer can access to the information by a simple reader. In addition, a producer can rewrite or erase the information readily. However, the transactor or consumer cannot rewrite or erase the information.

FIG. 13A illustrates a capsule 277 including an integrated circuit portion 250 installed with a noncontact integrated circuit device. A coil antenna 278 is formed inside the capsule 277 to communicate with an external reader/writer. For example, information on a condition of health of human or animals can be obtained quickly by dosing human or animals with the capsule installed with an integrated circuit device that stores information on a condition of health of the human or animals.

FIG. 13B illustrates an adhesive plaster 270 installed with the integrated circuit device 201, and a cover 272 thereof. The present invention can be applied to various medical supplies.

FIG. 13C illustrates an umbrella 230 installed with the integrated circuit device 201. Since the umbrella is generally formed by organic resin such as vinyl, as is the case with the packing film illustrated in FIG. 12A, the umbrella installed with the integrated circuit device can be completed by dispersing integrated circuit devices 201 randomly over a lower resin layer and coating the integrated circuit devices 201 by an upper resin layer. Especially, an umbrella is often treated as a lost-and-found item, and so the owner can be readily specified by installing the integrated circuit device to the umbrella. The method of dispersing integrated circuit devices randomly as mentioned above can be applied to the other products.

FIG. 13D illustrates an ID tag 273 installed with the integrated circuit device 201. The merchandise control becomes easy by attaching the ID tag 273 to a product. For example, when a product is stolen, the criminal can be known quickly by treading the path of the product. As mentioned above, a product that is superior in traceability (making an arrangement for obtaining reasons quickly in case of arising a problem at each complicated manufacturing or distributing stage by treading the path of the product) can be distributed.

An ID tag according to the present invention can be used to identify personal location. Accordingly, the possibility of getting involved in an accident can be reduced by knowing constantly and precisely personal location of infants, children, old persons, travelers, and the like in circumstances of increasing accidents such as atrocious crimes and disappearance.

Figure 14A:
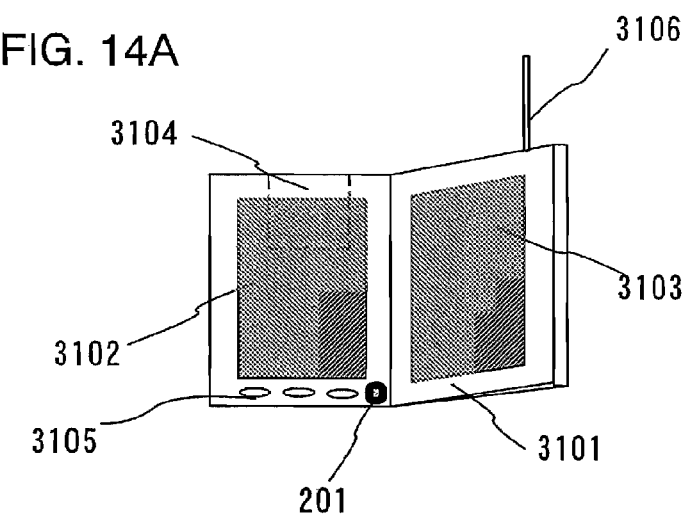
FIGS. 14A and 14B are explanatory views of an example of a product according to the present invention.

FIG. 14A illustrates a portable book (electronic book) installed with the integrated circuit 201 comprising a main body 3101, a display portions 3102, 3103, a storing medium 3104, operation switches 3105, an antenna 3106, and the like.

Figure 14B:
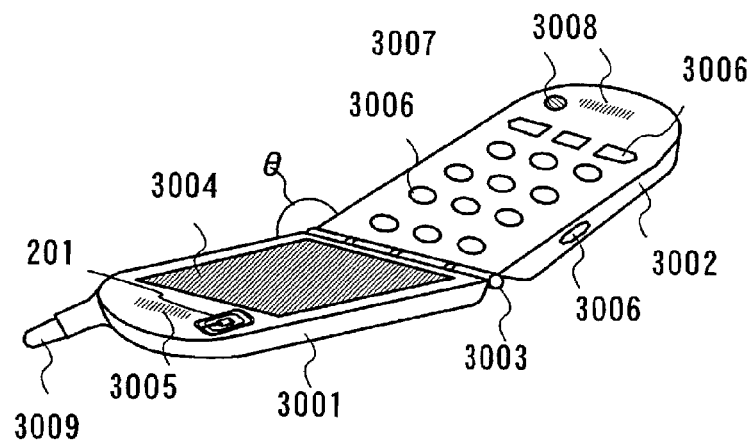

FIG. 14B illustrates a cellular phone installed with the integrated circuit 201 comprising a display panel 3001 and an operation panel 3002. The display panel 3001 and the operation panel 3002 are connected with each other by a connecting portion 3003. An angle θ between the plane provided with a display portion 3004 of the display panel 3001 and a plane provided with operation keys 3006 of the operation panel 3002 can be varied arbitrarily. Further, the cellular phone comprises a voice output portion 3005, a power supply switch 3007, a voice input portion 3008, and an antenna 3009.

Although not illustrated in the drawings, it is possible that an integrated circuit device using metals or the like that have no ill effects to human body or animals is mixed into food items and the like to control diet.

The integrated circuit or the noncontact integrated circuit according to the present invention can be utilized for various products outside of the foregoing products.

Example 3

A flow of a product installed with an integrated circuit device according to the present invention is explained with reference to FIGS. 18A and 18B in this example.

Figure 18A:
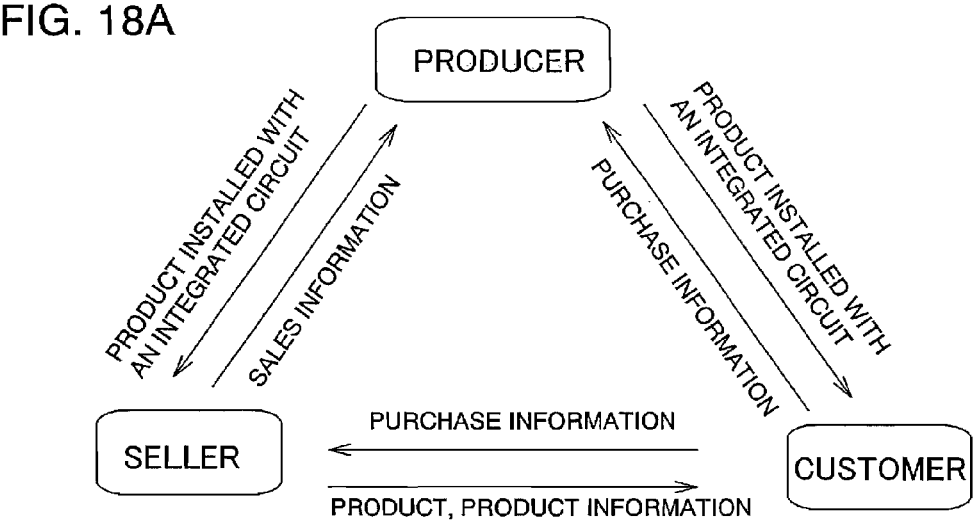
FIGS. 18A and 18B are views for showing a relationship among a producer (manufacturer), a seller, a consumer, a remarketer.

In FIG. 18A, a producer (manufacturer) provides a product installed with an integrated circuit device to a seller (retailer, wholesaler, and the like) or a customer. Accordingly, the seller can provide sales information such as fees of products, the number of selling products, the time of purchase, and the like to the producer (manufacturer) when the customer pays for the product. On the other hand, the customer can provide purchase information such as private information to the seller. For example, purchase information can be provided to the seller or the producer (manufacturer) by using a credit card installed with an integrated circuit device, a personal reader, or the like via Internet or the like. Further, the seller can provide product information by the integrated circuit device to the customer, whereas the seller can be obtained purchase information from the customer. The sales information and the purchase information is valuable information that can be useful for future sales strategy.

As a means for providing various kinds of information, a method that information that is read from an integrated circuit device by a reader of a seller or a customer is sent to a producer (manufacturer), a seller, or a customer via a computer or network. Various kinds of information as mentioned above can be provided via an integrated circuit device to a person who needs the information, accordingly, an integrated circuit device according to the present invention is useful for commodity transaction or merchandise control.

Figure 18B:
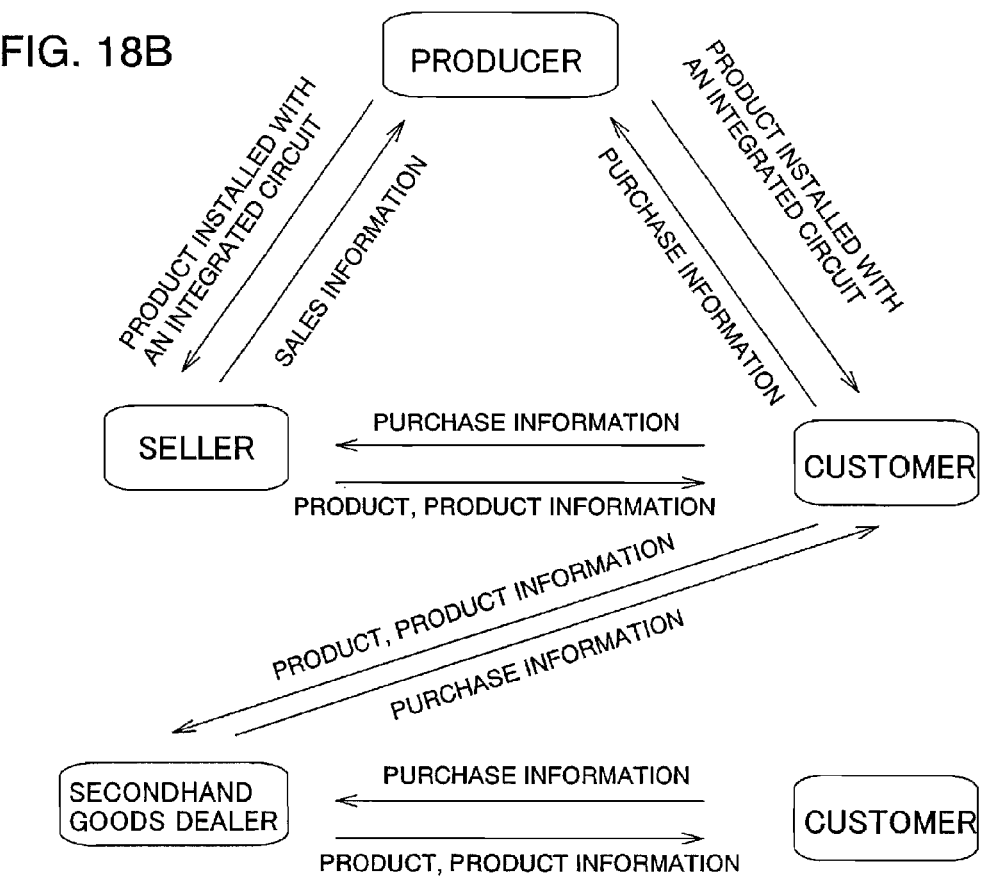

On the other hand, FIG. 18B illustrates the case that a product is distributed from a customer to a secondhand goods dealer. The customer can provide purchase information such as private information. For example, purchase information can be provided to the secondhand goods dealer by a credit card installed with an integrated circuit device, a personal reader, or the like via Internet or the like. Further, the secondhand goods dealer provides product information to the customer by the integrated circuit device, whereas the seller can obtain purchase information from the customer. The sales information and the purchase information is valuable information that can provide the status of use, the tenure of use, or the like of the used product. Accordingly, the sales information is useful for future sales strategy such as price setting or customer choice.

Example 4

Figure 19A:
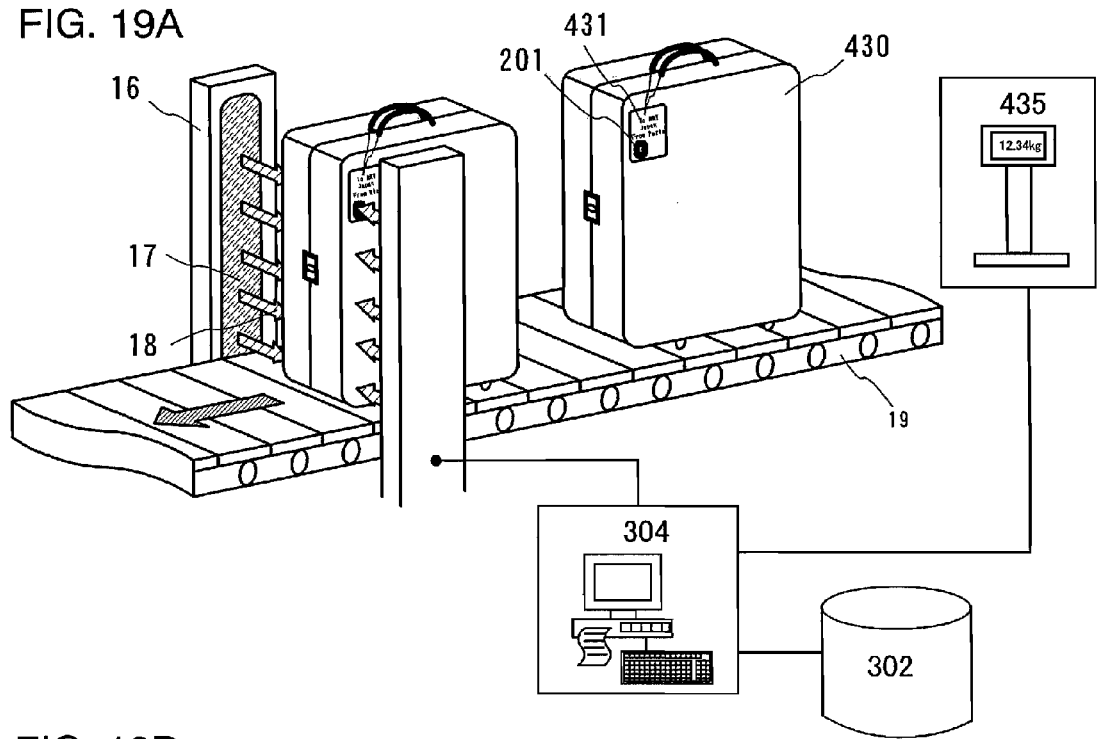
FIGS. 19A and 19B are explanatory views for showing a method for managing product information according to the present invention in a baggage check.
Figure 19B:
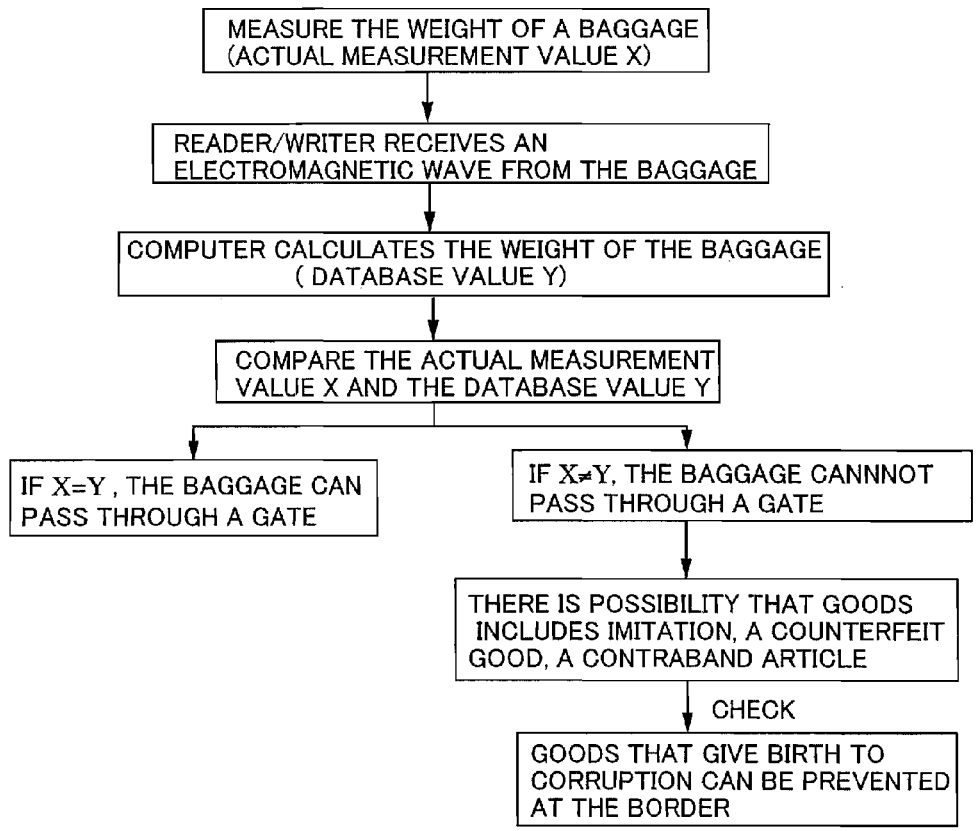

A method for controlling a product having an integrated circuit device according to the present invention is explained in this example with reference to FIGS. 19A and 19B.

FIG. 19A illustrates, for example, baggage checks at the airport. Baggage 430 is mounted with an ID tag 431 installed with an integrated circuit device 201. The baggage 430 moves over a conveyor 19 to pass through a reader/writer 16 and runs the integrated circuit device 201 by an electromagnetic wave 18 oscillated from an antenna 17 to convert information stored in a memory into signals and to send back the information converted into signals to the reader/writer 16. Accordingly, a computer 304 recognizes the information.

A system configured by the foregoing system added with a weight measuring machine 435 for baggage is explained in this example with reference to FIGS. 19A and 19B.

The weight of the baggage 430 is measured by the weight measuring machine 435 to obtain an actual measurement value X. The actual measurement value X is sent to the computer 304 to store in a predetermined address or a memory.

Upon passing the baggage 430 through the reader/writer 16, the reader/writer 16 receives an electromagnetic wave from the baggage 430 to read information on the whole baggage (including a product therein, a case, a tag, and the like), and adds the weight of individual products, then, calculates the weight of the whole baggage to obtain a database value Y. The weight of the individual products may be obtained based on information that is read by a memory in an integrated circuit device installed to the individual products. Alternatively, the weight of the individual products may be obtained by checking the information that is read from the memory against a database 302. Further, the database 302 stores only information on a product that is distributed to the market properly (lawfully) (hereinafter, the product is referred to as an authentic product).

The whole baggage is authentic and can pass through a gate in case that the comparison result of the actual measurement value X and the database value Y is X=Y or within an error range. Even if the baggage is authentic, banned hazardous materials or weapons included in the baggage are detected by a computer. In this instance, software in the computer may be programmed so that such the baggage cannot pass through a gate.

On the other hand, the comparison result of the actual measurement value X and the database value Y is X≠Y, there is possibility that goods that give birth to corruption such as imitation, a counterfeit good, a contraband article are included in the baggage. In this instance, the baggage cannot pass through a gate to be left in the hands of an inspector. Hence, the imitation can be prevented from inflowing into the country or flowing outside the country at the border. Moreover, hazardous materials or weapons can be detected, which results to counterterrorism.

Example 5

Figure 15A:
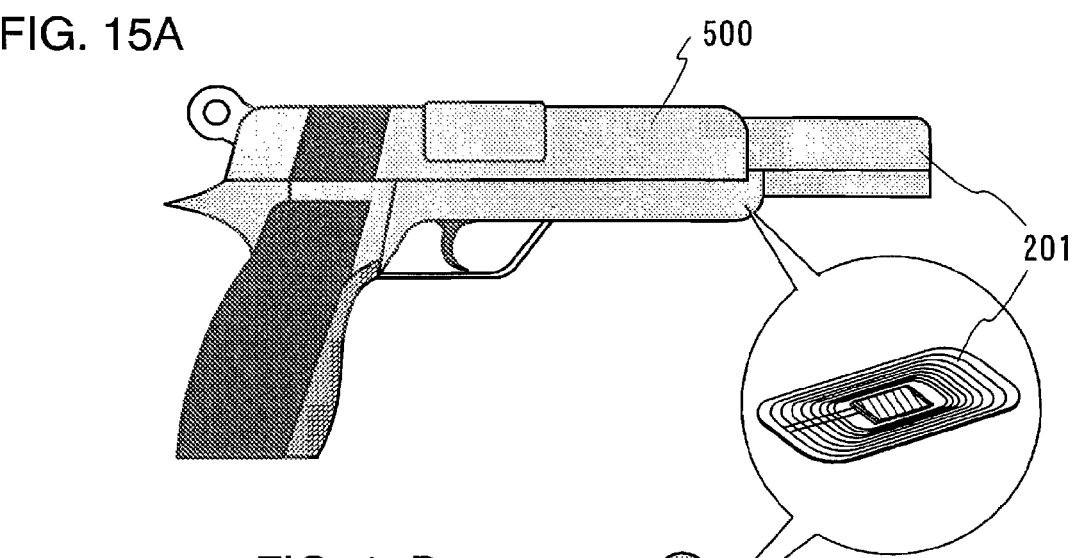
FIGS. 15A and 15B are explanatory views of an example of a product according to the present invention.
Figure 15B:
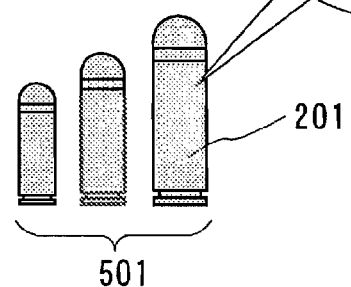
Figure 20:
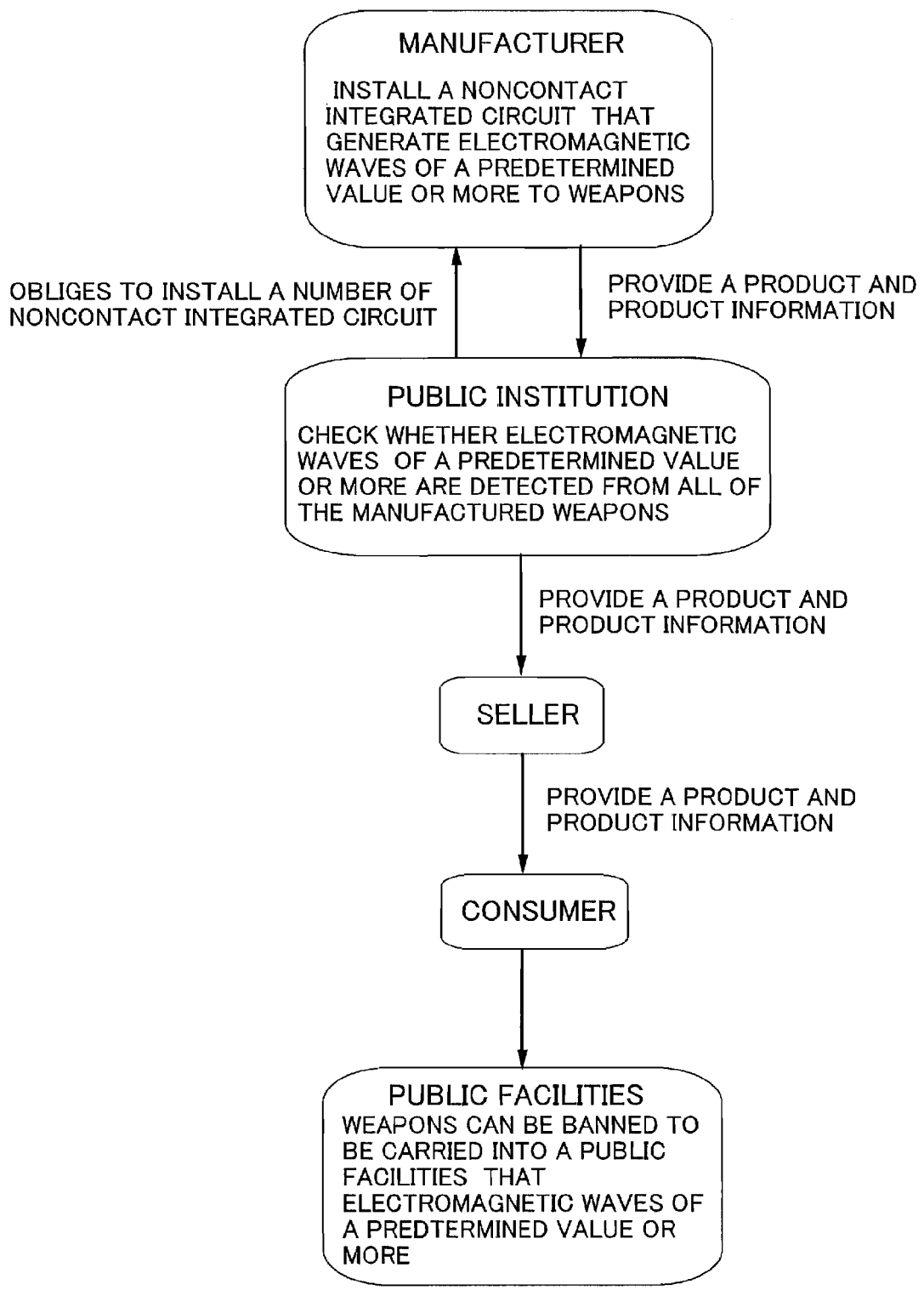
FIG. 20 is an explanatory view for a method for controlling hazardous materials or weapons.

Weapons having integrated circuit devices according to the present invention and a method for controlling the weapons are explained in this example with reference to FIGS. 15A, 15B, and 20.

FIGS. 15A and 15B illustrate respectively a handgun 500 and bullets 501, each of the handgun 500 and the bullets 501 have an integrated circuit device 201. A material such as a metal for manufacturing weapons or bullets is installed with a number of noncontact integrated circuit devices.

FIG. 20 is a flow diagram for illustrating a method for controlling weapons. Since weapons are generally restricted to carry on public facilities such as the station or the airport, it is required that the person who carries weapons should be prevented from passing through a ticket gate at the station or a gate at the airport. Therefore, it is preferably that a public institution obliges a weapon manufacturer to install a number of noncontact integrated circuit devices that generate electric waves (frequencies) of a predetermined value or more to weapons in order to have higher detection sensitivity than the other products. All of manufactured weapons are tested that electric waves of a predetermined value or more are detected from all of the manufactured weapons by a third institution such as a public institution or inspection institution. After the test, the weapons are put on a distribution process. Accordingly, weapons can be banned to be carried into a public facilities in the case that electric waves (frequencies) of a predetermined value or more are detected at the public institution or the like.

The foregoing controlling method is not limited to weapons; it can be applied to another hazardous material and the like. Further, a contraband article and the like that cannot be monitored by the foregoing public institution can be controlled by using the controlling method with that described in Example 4.

The provision on the number of integrated circuits to be installed or the frequency of electric waves to be detected is preferably for not only weapons or hazardous material but also all products or product groups in view of merchandise management.

Example 6

A structure of a noncontact ID card having a display device is explained with reference to FIGS. 16A and 16B in this example.

Figure 16A:
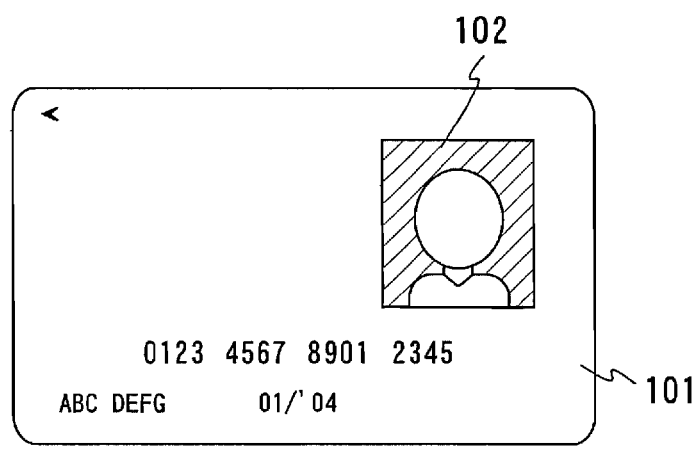
FIGS. 16A and 16B are explanatory views of a noncontact ID card including a display portion.

FIG. 16A illustrates one embodiment of an ID card according to the present invention. The ID card illustrated in FIG. 16A is a noncontact ID card that carries out noncontact transmissions of data with a reader/writer that is a terminal device. Reference numeral 101 denotes a card main body, and 102 denotes a pixel portion of a display device installed to the card main body 101.

Figure 16B:
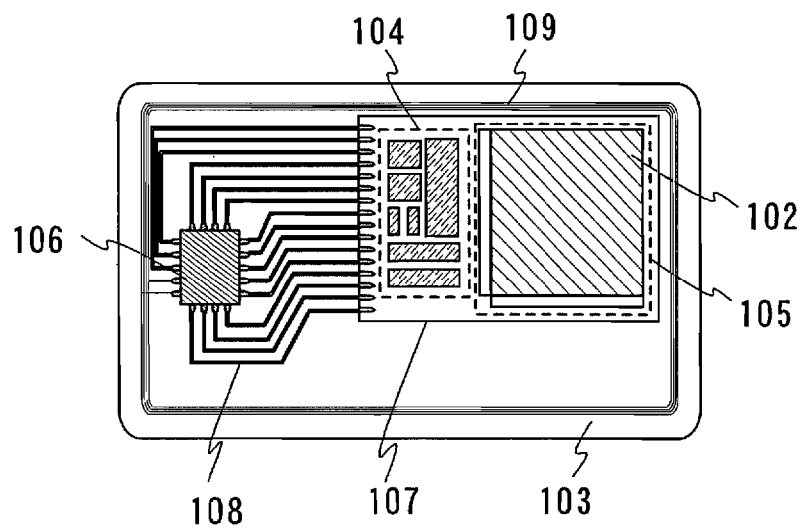

FIG. 16B illustrates a structure of a card substrate 103 included in the card main body 101 illustrated in FIG. 16A. An integrated circuit 104 formed by a thin semiconductor film and a display device 105 are pasted onto the card substrate 103. The integrated circuit 104 and the display device 105 are respectively formed over separate substrates that are prepared separately to be printed on the card substrate 103. As a method for printing, a number of integrated circuits manufactured according to the present invention are pasted by using a small-size vacuum tweezers or a pin, or selectively pasted by using UV light irradiating method. A pixel portion or a drive circuit portion in the display device can be pasted after they are manufactured according to the present invention. In this specification, a portion, which is formed by a thin semiconductor film, and which includes the integrated circuit 104 and the display device 105 to be printed on the card substrate is referred to as a thin film portion 107.

An IC chip 106 using a single crystalline semiconductor substrate is mounted to the card substrate 103. The IC chip 106 is provided with an integrated circuit. A method for mounting the IC chip 106 is not especially limited. A known COG method, a wire bonding method, a TAB method, or the like can be used. In this specification, a first integrated circuit provided to the IC chip is referred to as a single crystalline integrated circuit to distinguish from the integrated circuit. The IC chip 106 is electrically connected to a thin film portion 107 via a wiring 108 provided to the card substrate 103.

An antenna coil 109 electrically connected to the IC chip 106 is formed over the card substrate 103. Since a noncontact ID card can carry out noncontact data transmissions with a terminal device with electromagnetic induction by the antenna coil 109, the noncontact ID card can be prevented from being damaged by physical wear compared to a contact ID card. Moreover, the noncontact ID card can be used as a tag for carrying out noncontact control of information (wireless tag). The noncontact ID card has extremely larger amount of controllable information than that of a barcode that can also carry out noncontact reading of information. The distance between the noncontact ID card and a terminal device capable of reading information can be longer than that in the case of using a barcode.

FIG. 16B illustrates an example of forming the antenna coil 109 over the card substrate 103. Alternatively, an antenna coil that was separately manufactured may be mounted over the card substrate 103. For example, an antenna coil formed by winding a copper wire or the like in a coil form to be pressed between two plastic films having thicknesses of approximately 100 μm may be used. An antenna coil can be formed into the integrated circuit. In FIG. 16B, one antenna coil 109 is used for one ID card. Alternatively, a plurality of antenna coils may be used.

FIG. 16B illustrates an embodiment of an ID card installed with a display device. However, it is not limited to the structure; the display device is not always required. Note that the display device can display data of a facial portrait, and so it becomes difficult to switch the facial portrait with another compared to the case of using a printing method. Further, information except the facial portrait can be displayed. Accordingly, the function of the ID card can be improved.

As the card substrate 103, a plastic substrate having flexibility can be used. As a plastic substrate, ARTON made by JSR formed by norbornene resin with a polar group can be used. Further, poly(ethylene terephthalate) (PET), poly(ether sulfone) (PES), poly(ethylene naphthalate) (PEN), polycarbonate (PC), nylon, polyetheretherketone (PEEK), polysulfone (PSF), poly(ether imide) (PEI), polyarylate (PAR), poly (butylene terephthalate) (PBT), polyimide, or the like can be used for the plastic substrate.

Electrical interconnection between the IC chip and the integrated circuit is not limited to the embodiment that is illustrated in FIGS. 16A and 16B in this example. For example, a terminal of the IC chip may be directly connected to a terminal of the integrated circuit by using anisotropic conductive resin or by soldering without through the wiring formed over the card substrate.

In FIGS. 16A and 16B, connection between the integrated circuit and the wiring formed over the card substrate can be made by wire bonding, or flip chip method using a solder ball. Alternatively, they can be directly connected by using anisotropic conductive resin or by soldering. Further alternatively, another method can be used.

Example 7

A structure of a contact ID card having a display device is explained in this example with reference to FIGS. 17A to 17E.

An ID card illustrated in FIG. 17A is a contact ID card that carries out transmissions of data by connecting electrically a connecting terminal provided to the ID card to a reader/writer of a terminal device.

Reference numeral 251 denote a main body of a card; 252, a pixel portion of a display portion mounted on the card main body 251; and 253, a connecting terminal of an integrated circuit mounted on the card main body 251. The connecting terminal 253 is directly connected to a reader/writer provided to the terminal device to carry out transmissions between the terminal device and the ID card.

FIG. 17B illustrates a structure of a card substrate 254 included in the card main body 251 illustrated in FIG. 17A. As is the case with FIG. 16B, an integrated circuit 255 formed by a thin semiconductor film and a display device 256 are pasted onto the card substrate 254. The integrated circuit 255 and the display device 256 are printed on the card substrate 254 after that they are formed over a substrate that is prepared separately. As a method for printing, a number of integrated circuit devices are manufactured according to the present invention to be pasted by using small-size vacuum tweezers or a pin, or selectively pasted by using UV light irradiating method. In this specification, the integrated circuit 255 and the display device 256 correspond to a thin film portion 257.

FIG. 17C is a magnified view for showing a connecting terminal 253 illustrated in FIGS. 17A and 17B. Further, FIG. 17D is a magnified view for showing a reverse face of a printed wiring board 258 provided with the connecting terminal 253 illustrated in FIG. 17C. The connecting terminal 253 is formed over the printed wiring board 258 and is connected electrically to a terminal 260 formed over a reverse face of the printed wiring board 258 via a contact hole 259 provided to the printed wiring board 258. FIG. 17C illustrates an example of eight connecting terminals 253 are provided. Needless to say, the number of connecting terminals are not limited thereto.

An IC chip 261 provided with a single crystalline integrated circuit is provided to a reverse side of a face provided with the connecting terminal 253 of the printed wiring board 258. The IC chip 261 is electrically connected to the terminal 260. A terminal 262 for electrically connecting the IC chip 261 and the integrated circuit is provided to a reverse side of a face provided with the connecting terminal 253 of the printed wiring board 258.

FIG. 17D illustrates an embodiment in which the IC chip 261 is connected to the terminals 260 and 262 by a wire bonding method. However, the connecting method is not limited to the wire bonding method. A flip chip method using a solder ball or another method can be used.

The terminal 262 can be connected to the wiring 263 provided to the card substrate 254 by pasting a reverse face of the printed wiring board 258 onto the card substrate 254 as illustrated in FIG. 17B. The IC chip 261 is electrically connected to the thin film portion 257 via the wiring 263.

FIG. 17E is a cross-sectional view for showing the state that the reverse face of the printed wiring board 258 onto the card substrate 254. As shown in FIG. 17E, the connecting terminal 253 is electrically connected to the terminal 260 via the contact hole 259. The IC chip 261 is electrically connected to the terminals 260 and 262. Then, a mold 264 containing resin or the like is formed to cover the IC chip 261 and the terminal 260. The terminal 262 is not completely covered by the mold 264 to expose at least a part of the mold 264. And then, the terminal 262 and the wiring 263 are electrically connected with each other by anisotropic conductive resin 265.

Since a contact ID card can carry out transmissions of data with a terminal device via an electric contact between a reader/writer of the terminal device and a connecting terminal, the power supply to an ID card is stabilized compared to a noncontact ID card. Therefore, the contact ID card carries less risk of poor transmissions than a noncontact ID card in process of the transmission.

In this example, the electric connection between the IC chip and the integrated circuit is not limited to the embodiment illustrated in FIGS. 17A to 17E. For example, a terminal of the IC chip may be directly connected to a terminal of the integrated circuit by using anisotropic conductive resin or by soldering without through the wiring formed over the card substrate.

In FIGS. 17A to 17E, connection between the integrated circuit and the wiring formed over the card substrate can be made by wire bonding, or flip chip method using a solder ball. Alternatively, they can be directly connected by using anisotropic conductive resin or by soldering. Further alternatively, another method can be used.

Example 8

A structure of an RFID chip (registered trademark) having an integrated circuit device according to the present invention is explained with reference to FIGS. 22 and 23 in this example.

Figure 22:
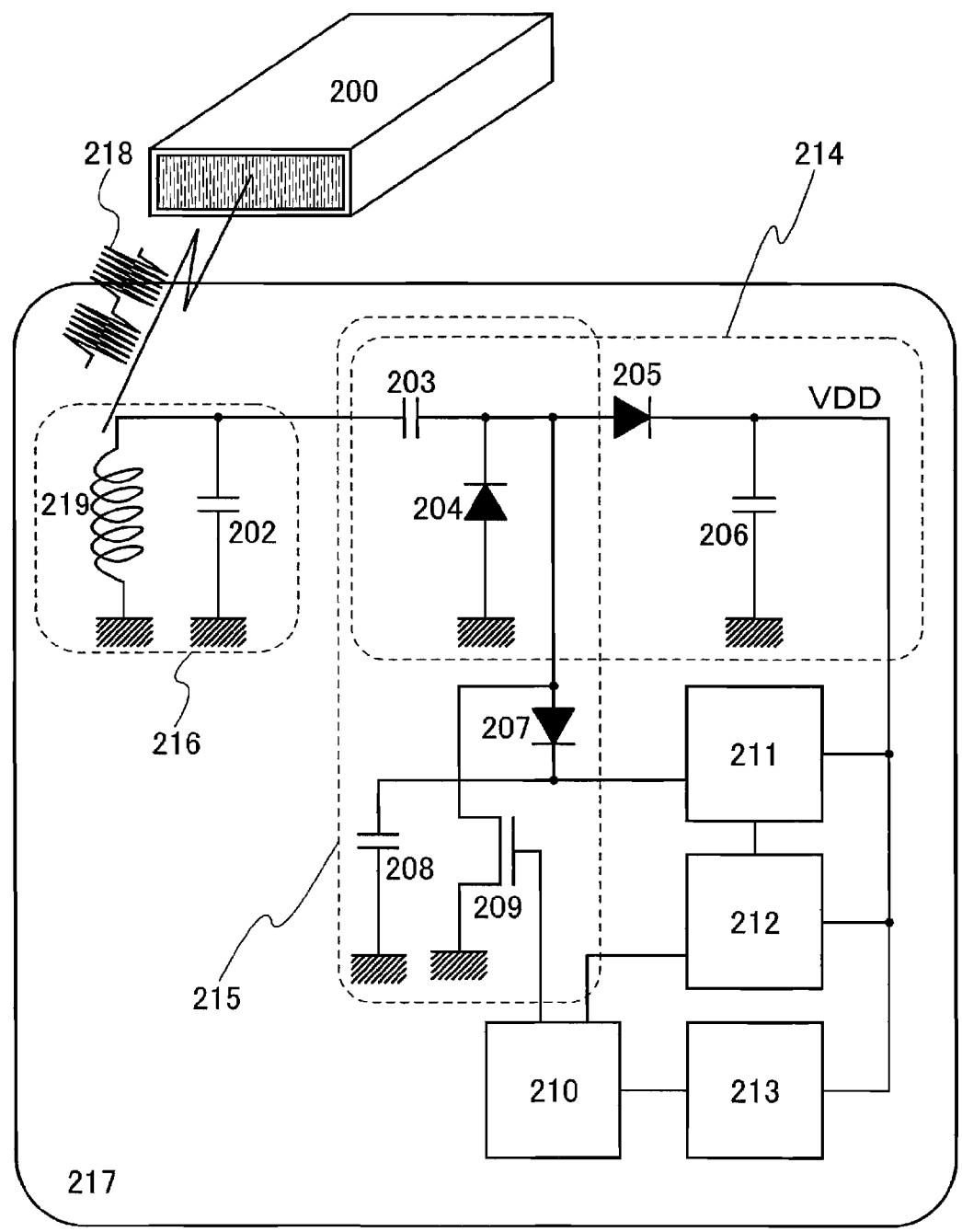
FIG. 22 is a circuit diagram of a noncontact integrated circuit device used in the present invention.

FIG. 22 is a schematic view of an RFID chip. The RFID chip comprises a power supply circuit 214, an input output circuit 215, an antenna circuit 216, a logic circuit 210, an amplifier 211, a clock generation circuit/decoder 212, a memory 213, and the like. The antenna circuit 216 has an antenna wiring 219 and an antenna capacity 202.

Although an RFID chip has no unique power source, the RFID chip operates upon being supplied with electricity by receiving an electromagnetic wave 218 emitted from a reader/writer 200. When the antenna circuit 216 receives the electromagnetic wave 218 from the reader/writer 200, a detected output signal is detected by the input output circuit 215 composed of a first capacitor 203, a first diode 204, a third diode 207, a third capacitor 208, and the like. The signal is amplified into a sufficient large amplitude by the amplifier 211 and divided into clock and data/instruction by a clock generating circuit/decoder 212. Then, the sent instruction is decoded in the logic circuit 210, and data in the memory 213 is replied, then, necessary information is written to the memory 213.

The respond is made by turning ON/OFF of a switching element 209 by the output of the logic circuit 210. Accordingly, the impedance of the antenna circuit 216 is varied; as a result, the reflectivity of the antenna circuit 216 is varied. The reader/writer 200 reads information from the RFID chip by monitoring the variation of the reflectivity of the antenna circuit 216.

Electric power that is consumed in each circuit within an RFID chip 217 is supplied by direct-current power source VDD generated by detecting and smoothing the electromagnetic wave 218 which is received by the antenna circuit 216, in the power supply circuit 214. The power supply circuit 214 comprises the first capacitor 203, the first diode 204, a second diode 205, and the second capacitor 206. The second capacitor 206 sets enough large value for supplying electric power to each circuit.

Figure 23:
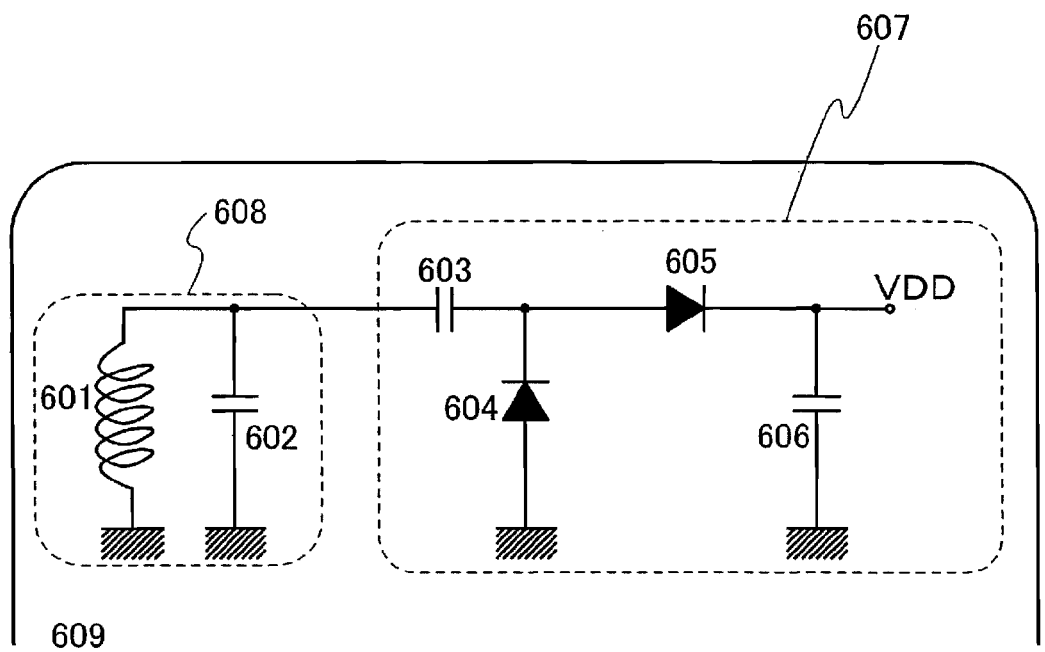
FIG. 23 is an antenna circuit diagram and a power supply circuit diagram of a noncontact integrated circuit device used in the present invention.
Figure 24:
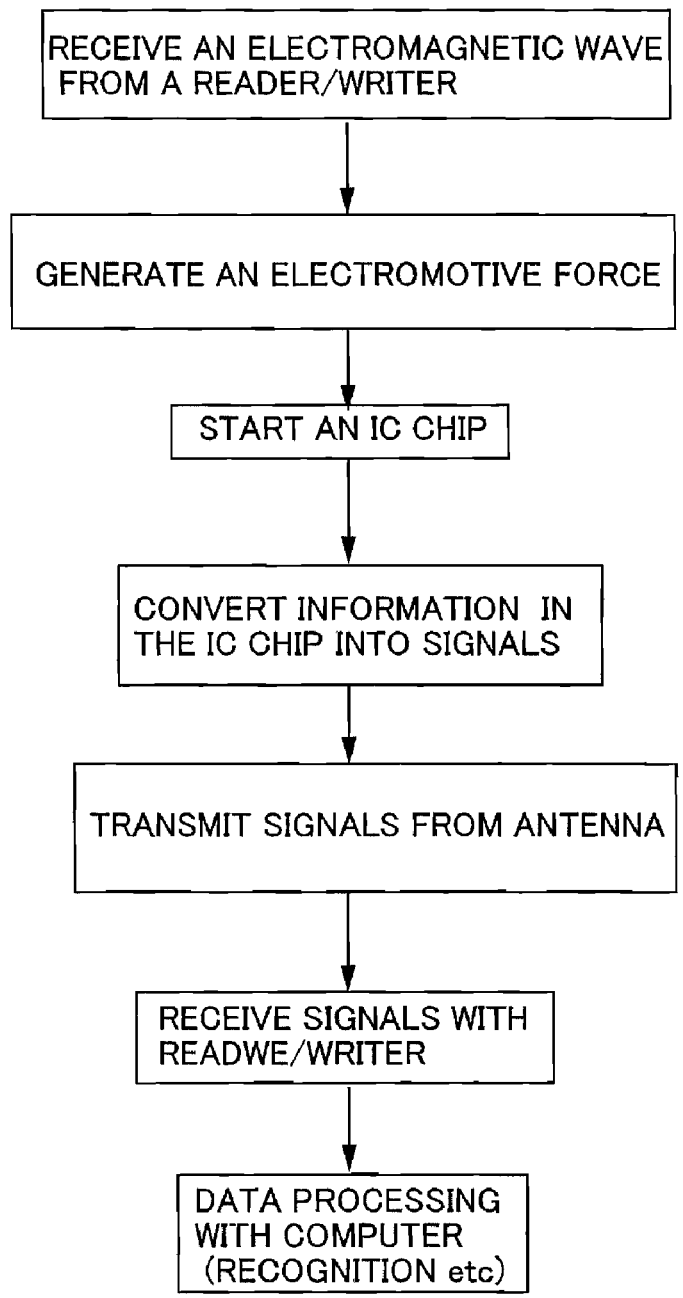
FIG. 24 is a flow diagram for showing a method for identifying information included in a product.

FIG. 23 is an excerpt of an antenna circuit 608 and a power supply circuit 607 among circuits used for the RFID chip 609. The antenna circuit 608 has an antenna wiring 601 and an antenna capacity 602. The power supply circuit 607 has a first capacitor 603, a first diode 604, a second diode 605, and a second capacitor 606.

An ID chip has a characteristic of operating without battery. As noted above, an electromagnetic wave emitted from a reader/writer is received by the antenna circuit 608 to be rectified in the power supply circuit 607. Then, direct current-voltage is generated. And then, a circuit installed in the ID chip starts operating due to the direct current-voltage.

Example 9

A method for connecting and sealing an integrated circuit and an antenna in forming a noncontact integrated circuit device is explained with reference to FIGS. 21A and 21B.

Figure 21A:
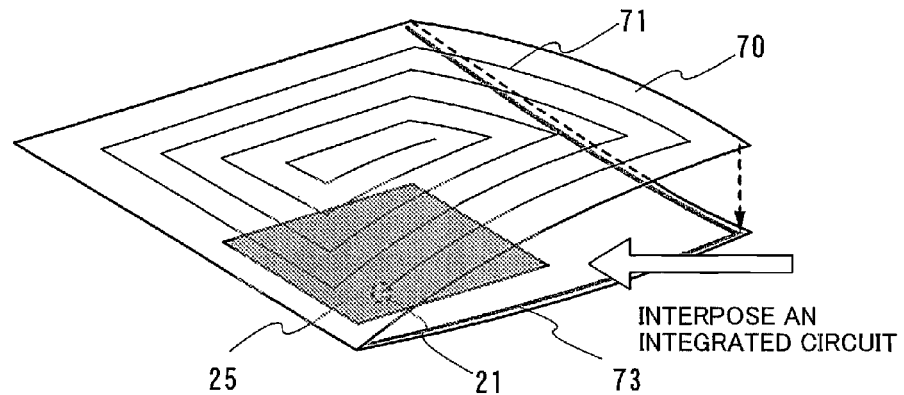
FIGS. 21A and 21B are explanatory views for a method for sealing a noncontact integrated circuit device.
Figure 21B:
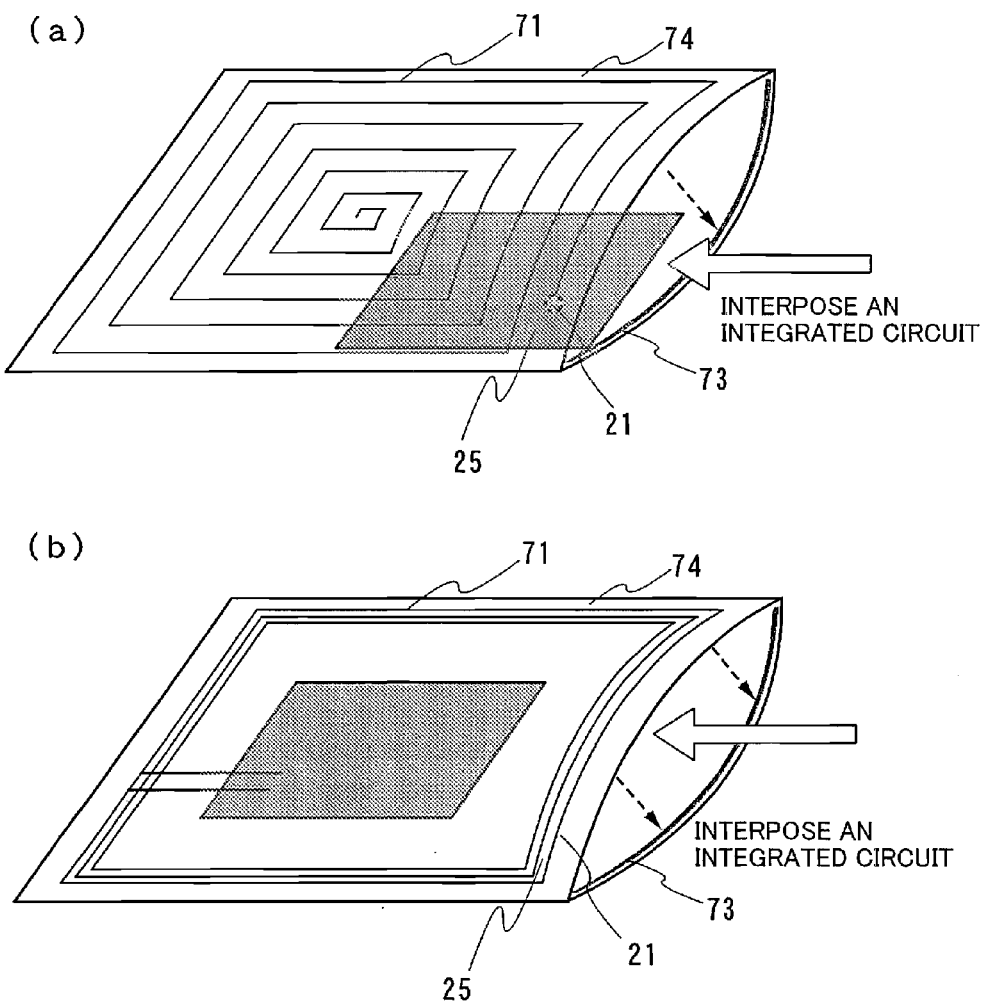

FIG. 21A shows a flexible substrate 70 for wrapping foods in a wrap form stapled its two sides. FIG. 21B shows a flexible substrate 74 for wrapping foods in an envelope form stapled three sides. Antennas 71 are formed over both surfaces of these flexible substrates. An integrated circuit 25 is interposed between each of these flexible substrates to be pasted with adhesive 73. A connecting portion 21 is opened to connect the antennas to each other, or connect the antennas to the integrated circuit. The integrated circuit 25 may be provided by a vacuum small-size tweezers.

Further, the antennas may be provided inside these substrates. The antenna may be formed in whorls as shown in FIGS. 21A and 21B (a) or in a closed loop as shown in FIG. 21B (b). As a material for the antennas, various conductive materials can be used. Especially, the antennas preferably include Ag, Au, Al, Cu, Zn, Sn, Ni, Cr, Fe, Co, or Ti.

A connecting terminal for connecting the integrated circuit 25 and the antenna 71 can be provided at a desired position. As a method for connecting, besides a method using an anisotropic conductive film, a known method such as a COG method, a wire bonding method, or a TAB method can be used.

A product according to the present invention such as paper money is installed with an integrated circuit including at least two or more of nonvolatile memories, wherein one of nonvolatile memory stores specific information. The reading and writing (lock, unlock) of the foregoing one of the nonvolatile memory can be controlled by rewriting information stored in the other nonvolatile memory. The access to the information can be restricted especially in a distribution process, that is, product-specific information can be prevented from being perceived from outside. Even if the product is thieved, the product is not used wrongfully or counterfeited. Further, privacy is not invaded since the product-specific information cannot be read. Any of a noncontact, contact, or hybrid integrated circuit device can be applied to the present invention. The range of utilization is wide.

Although the present invention has been fully described by way of examples with reference to the accompanying drawings, it is to be understood that various changes and modifications will be apparent to those skilled in the art. Therefore, unless otherwise such changes and modifications depart from the scope of the present invention hereinafter described, they should be construed as being included therein.

What is claimed is:

1. An article comprising:
a printed wiring board;
a contact hole formed in the printed wiring board;
an IC chip on a first side of the printed wiring board comprising:
   a first nonvolatile memory storing a first piece of information including article-specific information; and
   a second nonvolatile memory storing a second piece of information used for controlling reading of the first piece of information and writing of new information to the first nonvolatile memory;
a first terminal and a second terminal on the first side of the printed wiring board;
a third terminal on a second side of the printed wiring board; and
a wiring over a substrate,
wherein the printed wiring board is attached to the substrate so that the first side of the IC chip faces the substrate,
wherein the IC chip is electrically connected to the first terminal through a first wire and to the second terminal through a second wire,
wherein the first terminal is electrically connected to the third terminal via the contact hole,
wherein the second terminal is electrically connected to the wiring by an anisotropic conductive film,
wherein the IC chip is configured to compare the second piece of information with a third piece of information sent from an external device,
wherein the IC chip is configured to transmit the first piece of information to the external device in a case where the second piece of information is the same as the third piece of information, and
wherein the IC chip is configured to terminate communication between the IC chip and the external device in a case where the second piece of information is different from the third piece of information.

2. The article according to claim 1, wherein the IC chip comprises a single crystalline integrated circuit.

3. The article according to claim 1, wherein the first terminal and the contact hole overlap each other.

4. The article according to claim 1, wherein the first terminal and the anisotropic conductive film overlap each other.

5. The article according to claim 1, further comprising a mold between the IC chip and the substrate.

6. An article comprising:
a printed wiring board;
a contact hole formed in the printed wiring board;
an IC chip on a first side of the printed wiring board comprising:
   a first nonvolatile memory storing a first piece of information including article-specific information; and
   a second nonvolatile memory storing a second piece of information used for controlling reading of the first piece of information and writing of new information to the first nonvolatile memory;
a first terminal and a second terminal on the first side of the printed wiring board;
a third terminal on a second side of the printed wiring board; and
a wiring over a substrate, the substrate including a depressed portion on a surface,
wherein the printed wiring board is attached to the substrate so that the first side of the IC chip faces the substrate,
wherein the IC chip is electrically connected to the first terminal through a first wire and to the second terminal through a second wire,
wherein the first terminal is electrically connected to the third terminal via the contact hole,
wherein the second terminal is electrically connected to the wiring by an anisotropic conductive film,
wherein the IC chip and the depressed portion of the substrate overlap each other,
wherein the IC chip is configured to compare the second piece of information with a third piece of information sent from an external device,
wherein the IC chip is configured to transmit the first piece of information to the external device in a case where the second piece of information is the same as the third piece of information, and
wherein the IC chip is configured to terminate communication between the IC chip and the external device in a case where the second piece of information is different from the third piece of information.

7. The article according to claim 6, wherein the IC chip comprises a single crystalline integrated circuit.

8. The article according to claim 6, wherein the first terminal and the contact hole overlap each other.

9. The article according to claim 6, wherein the first terminal and the anisotropic conductive film overlap each other.

10. The article according to claim 6, further comprising a mold between the IC chip and the substrate.

11. An article comprising:
a printed wiring board;
a contact hole formed in the printed wiring board;
an IC chip on a first side of the printed wiring board comprising:
   a first nonvolatile memory storing a first piece of information including article-specific information; and
   a second nonvolatile memory storing a second piece of information used for controlling reading of the first piece of information and writing of new information to the first nonvolatile memory;
a first terminal and a second terminal on the first side of the printed wiring board;
a third terminal on a second side of the printed wiring board;
a wiring over a substrate; and
a display device over the substrate,
wherein the printed wiring board is attached to the substrate so that the first side of the IC chip faces the substrate, wherein the IC chip is electrically connected to the first terminal through a first wire and to the second terminal through a second wire, wherein the first terminal is electrically connected to the third terminal via the contact hole, wherein the second terminal is electrically connected to the wiring by an anisotropic conductive film, wherein the wiring is electrically connected to the display device, wherein the IC chip is configured to compare the second piece of information with a third piece of information sent from an external device, wherein the IC chip is configured to transmit the first piece of information to the external device in a case where the second piece of information is the same as the third piece of information, and wherein the IC chip is configured to terminate communication between the IC chip and the external device in a case where the second piece of information is different from the third piece of information.

12. The article according to claim 11, wherein the IC chip comprises a single crystalline integrated circuit.

13. The article according to claim 11, wherein the first terminal and the contact hole overlap each other.

14. The article according to claim 11, wherein the first terminal and the anisotropic conductive film overlap each other.

15. The article according to claim 11, further comprising a mold between the IC chip and the substrate.

* * * * *